(12) United States Patent
Soltys et al.

(10) Patent No.: US 7,222,852 B2
(45) Date of Patent: May 29, 2007

(54) METHOD, APPARATUS AND ARTICLE EMPLOYING MULTIPLE MACHINE-READABLE INDICIA ON PLAYING CARDS

(75) Inventors: Richard Soltys, Mercer Island, WA (US); Richard Huizinga, Mercer Island, WA (US)

(73) Assignee: Ball Gaming International, Inc., Las Vegas, NV (US)

( * ) Notice: Subject to any disclaimer, the term of this patent is extended or adjusted under 35 U.S.C. 154(b) by 904 days.

(21) Appl. No.: 10/360,846

(22) Filed: Feb. 5, 2003

(65) Prior Publication Data

US 2003/0176209 A1 Sep. 18, 2003

Related U.S. Application Data

(60) Provisional application No. 60/354,683, filed on Feb. 6, 2002.

(51) Int. Cl.
*A63B 71/00* (2006.01)
*A63F 9/00* (2006.01)
*A63F 1/14* (2006.01)
*A63F 1/12* (2006.01)
*A63F 13/00* (2006.01)

(52) U.S. Cl. ............... 273/148 R; 273/309; 273/149 R; 273/149 P; 463/25; 463/29

(58) Field of Classification Search ............ 273/149 R, 273/149 P, 148 R, 309; 434/317; 706/11; 463/25, 29

See application file for complete search history.

(56) References Cited

U.S. PATENT DOCUMENTS

| 1,034,402 A | 7/1912 | Hardy |
| 1,727,800 A | 9/1929 | Albert |
| 2,694,662 A | 11/1954 | Hunter, Jr. ................... 154/121 |
| 3,222,071 A | 12/1965 | Lang ........................... 273/149 |
| 3,312,473 A * | 4/1967 | Friedman et al. ......... 273/149 P |
| 3,377,070 A * | 4/1968 | Nottoli ....................... 273/294 |
| 3,690,670 A * | 9/1972 | Cassady et al. ............. 273/293 |
| 3,751,041 A | 8/1973 | Seifert .................... 273/149 P |

(Continued)

FOREIGN PATENT DOCUMENTS

EP 0 327 069 A2 8/1989

(Continued)

OTHER PUBLICATIONS

U.S. Appl. No. 10/885,875, filed Jul. 7, 2004, Soltys et al.

(Continued)

*Primary Examiner*—Corbett B. Coburn
*Assistant Examiner*—William H McCulloch
(74) *Attorney, Agent, or Firm*—Seed IP Law Group PLLC

(57) ABSTRACT

A stacked set of playing cards are supported to expose an information bearing portion bearing a first machine-readable indicia and an information bearing portion bearing a second machine-readable indicia, such that each of the first and second machine-readable indicia from a number of cards are read by at least one reader. The second machine-readable indicia may provide redundancy, or may be related to the first machine-readable indicia to allow the authentication of the playing card.

24 Claims, 16 Drawing Sheets

U.S. PATENT DOCUMENTS

| | | | |
|---|---|---|---|
| 3,787,660 A | 1/1974 | Meyers et al. | 235/61.9 R |
| 3,814,436 A | 6/1974 | Boren | 273/149 P |
| 3,929,339 A * | 12/1975 | Mattioli | 273/148 A |
| 4,031,376 A | 6/1977 | Corkin, Jr. | 235/156 |
| 4,108,361 A | 8/1978 | Krause | 235/375 |
| 4,135,663 A | 1/1979 | Nojiri et al. | 235/463 |
| 4,241,921 A * | 12/1980 | Miller | 273/148 A |
| 4,244,582 A | 1/1981 | Raees et al. | 273/293 |
| 4,264,074 A * | 4/1981 | Sobajima | 273/149 R |
| 4,373,726 A | 2/1983 | Churchill et al. | 273/138 A |
| 4,377,285 A | 3/1983 | Kadlic | 273/148 A |
| 4,448,419 A | 5/1984 | Telnaes | 273/143 R |
| 4,531,187 A | 7/1985 | Uhland | 364/412 |
| 4,534,562 A | 8/1985 | Cuff et al. | 273/149 P |
| 4,636,846 A | 1/1987 | Villareal | 358/100 |
| 4,662,637 A | 5/1987 | Pfeiffer | 273/149 P |
| 4,667,959 A | 5/1987 | Pfeiffer et al. | 273/149 R |
| 4,693,480 A | 9/1987 | Smith | 273/296 |
| 4,725,079 A | 2/1988 | Koza et al. | 283/73 |
| 4,728,108 A | 3/1988 | Neuwahl | 273/296 |
| 4,750,743 A | 6/1988 | Nicoletti | 273/148 A |
| 4,814,589 A | 3/1989 | Storch et al. | 235/375 |
| 4,822,050 A | 4/1989 | Normand et al. | 273/149 P |
| 4,832,341 A | 5/1989 | Muller et al. | 273/139 |
| 4,885,700 A | 12/1989 | Kondziolka et al. | 364/519 |
| 4,951,950 A | 8/1990 | Normand et al. | 273/149 P |
| 4,995,615 A | 2/1991 | Cheng | 273/292 |
| 5,039,102 A * | 8/1991 | Miller | 273/148 R |
| 5,053,612 A | 10/1991 | Pielemeier et al. | 235/462 |
| 5,067,713 A | 11/1991 | Soules et al. | 273/149 P |
| 5,103,081 A | 4/1992 | Fisher et al. | 235/464 |
| 5,110,134 A | 5/1992 | Laughlin et al. | 273/293 |
| 5,114,153 A | 5/1992 | Rosenwinkel et al. | 273/292 |
| 5,121,921 A | 6/1992 | Friedman et al. | 273/149 P |
| 5,154,419 A * | 10/1992 | Madhavan | 273/126 R |
| 5,186,464 A | 2/1993 | Lamle | 273/149 R |
| 5,199,710 A | 4/1993 | Lamle | 273/149 R |
| 5,224,712 A * | 7/1993 | Laughlin et al. | 273/304 |
| 5,240,140 A * | 8/1993 | Huen | 221/13 |
| 5,259,907 A | 11/1993 | Soules et al. | 156/277 |
| 5,283,422 A | 2/1994 | Storch et al. | 235/375 |
| 5,312,104 A | 5/1994 | Miller | 273/148 R |
| 5,319,181 A | 6/1994 | Shellhammer et al. | 235/462 |
| 5,343,028 A | 8/1994 | Figarella et al. | 235/462 |
| 5,362,053 A * | 11/1994 | Miller | 273/148 R |
| 5,374,061 A | 12/1994 | Albrecht | 273/149 R |
| 5,397,133 A | 3/1995 | Penzias | 273/439 |
| 5,416,308 A | 5/1995 | Hood et al. | 235/454 |
| 5,431,399 A | 7/1995 | Kelley | 273/149 P |
| 5,511,784 A | 4/1996 | Furry et al. | 273/143 R |
| 5,518,249 A | 5/1996 | Sines et al. | 273/304 |
| 5,548,110 A | 8/1996 | Storch et al. | 235/472 |
| 5,586,936 A | 12/1996 | Bennett et al. | 463/25 |
| 5,605,334 A | 2/1997 | McCrea, Jr. | 273/309 |
| 5,613,680 A | 3/1997 | Groves et al. | 273/138.2 |
| 5,613,912 A | 3/1997 | Slater | 463/25 |
| 5,632,483 A * | 5/1997 | Garczynski et al. | 273/148 R |
| 5,654,050 A | 8/1997 | Whalen-Shaw | 428/35.7 |
| 5,655,961 A | 8/1997 | Acres et al. | 463/27 |
| 5,669,816 A | 9/1997 | Garczynski et al. | 463/12 |
| 5,681,039 A * | 10/1997 | Miller | 273/148 R |
| 5,698,839 A | 12/1997 | Jagielinski et al. | 235/493 |
| 5,707,287 A | 1/1998 | McCrea, Jr. | 463/27 |
| 5,711,525 A | 1/1998 | Breeding | 273/292 |
| 5,722,893 A | 3/1998 | Hill et al. | 463/47 |
| 5,735,525 A | 4/1998 | McCrea, Jr. | 273/309 |
| 5,735,742 A | 4/1998 | French | 463/25 |
| 5,755,618 A | 5/1998 | Mothwurf | 453/17 |
| 5,757,876 A | 5/1998 | Dam et al. | 377/7 |
| 5,766,074 A | 6/1998 | Cannon et al. | 463/16 |
| 5,770,533 A | 6/1998 | Franchi | 463/42 |
| 5,772,505 A | 6/1998 | Garczynski et al. | 463/12 |
| 5,779,545 A | 7/1998 | Berg et al. | 463/22 |
| 5,779,546 A | 7/1998 | Meissner et al. | 463/25 |
| 5,780,831 A | 7/1998 | Seo et al. | 235/462 |
| 5,781,647 A | 7/1998 | Fishbine et al. | 382/1 |
| 5,785,321 A | 7/1998 | van Putten et al. | 273/309 |
| 5,788,573 A | 8/1998 | Baerlocher et al. | 463/16 |
| 5,791,988 A | 8/1998 | Nomi | 463/11 |
| 5,801,766 A | 9/1998 | Alden | 348/157 |
| 5,803,808 A | 9/1998 | Strisower | 463/11 |
| 5,803,809 A | 9/1998 | Yoseloff | 463/13 |
| 5,809,482 A | 9/1998 | Strisower | 705/30 |
| 5,830,064 A | 11/1998 | Bradish et al. | 463/22 |
| 5,842,921 A | 12/1998 | Mindes et al. | 463/16 |
| 5,863,249 A | 1/1999 | Inoue | 463/20 |
| 5,871,400 A | 2/1999 | Yfantis | 463/22 |
| 5,895,048 A | 4/1999 | Smith, Jr. | 273/293 |
| 5,909,876 A | 6/1999 | Brown | 273/309 |
| 5,911,419 A * | 6/1999 | Delaney et al. | 273/292 |
| 5,911,626 A | 6/1999 | McCrea, Jr. | 463/27 |
| 5,919,090 A | 7/1999 | Mothwurf | 463/25 |
| 5,919,091 A | 7/1999 | Bell et al. | 463/25 |
| 5,941,769 A | 8/1999 | Order | 463/12 |
| 5,945,654 A | 8/1999 | Huang | 235/449 |
| 5,954,654 A | 9/1999 | Eaton et al. | 600/462 |
| 5,967,893 A | 10/1999 | Lawrence et al. | 463/10 |
| 5,989,122 A | 11/1999 | Roblejo | 463/22 |
| 6,010,404 A | 1/2000 | Walker et al. | 463/21 |
| 6,039,650 A | 3/2000 | Hill | 463/47 |
| 6,042,150 A | 3/2000 | Daley | 283/86 |
| 6,062,981 A | 5/2000 | Luciano, Jr. | 463/26 |
| 6,068,552 A | 5/2000 | Walker et al. | 463/21 |
| 6,093,103 A | 7/2000 | McCrea, Jr. | 463/27 |
| 6,117,009 A | 9/2000 | Yoseloff | 463/20 |
| 6,117,012 A | 9/2000 | McCrea, Jr. | 462/27 |
| 6,126,166 A | 10/2000 | Lorson et al. | 273/148 R |
| 6,145,838 A | 11/2000 | White | 273/295 |
| 6,149,154 A | 11/2000 | Grauzer et al. | 273/149 R |
| 6,152,822 A | 11/2000 | Herbert | 463/22 |
| 6,159,096 A | 12/2000 | Yoseloff | 463/20 |
| 6,165,069 A | 12/2000 | Sines et al. | 463/12 |
| 6,166,763 A | 12/2000 | Rhodes et al. | 348/143 |
| 6,186,892 B1 | 2/2001 | Frank et al. | 463/19 |
| 6,193,607 B1 | 2/2001 | Kay | 463/22 |
| 6,196,547 B1 | 3/2001 | Pascal et al. | 273/292 |
| 6,217,447 B1 | 4/2001 | Lofink et al. | 463/12 |
| 6,234,898 B1 | 5/2001 | Belamant et al. | 463/25 |
| 6,250,632 B1 | 6/2001 | Albrecht | 273/149 R |
| 6,254,096 B1 * | 7/2001 | Grauzer et al. | 273/149 R |
| 6,254,484 B1 | 7/2001 | McCrea, Jr. | 463/27 |
| 6,267,248 B1 | 7/2001 | Johnson et al. | 209/547 |
| 6,267,671 B1 | 7/2001 | Hogan | 463/25 |
| 6,293,864 B1 * | 9/2001 | Romero | 463/12 |
| 6,299,536 B1 | 10/2001 | Hill | 463/47 |
| 6,312,334 B1 | 11/2001 | Yoseloff | 463/25 |
| 6,313,871 B1 | 11/2001 | Schubert | 348/143 |
| 6,315,664 B1 | 11/2001 | Baerlocher et al. | 463/21 |
| 6,346,044 B1 | 2/2002 | McCrea, Jr. | 463/27 |
| 6,357,746 B1 | 3/2002 | Sadowski | 273/148 R |
| 6,361,044 B1 * | 3/2002 | Block et al. | 273/149 R |
| 6,371,482 B1 | 4/2002 | Hall, Jr. | 273/138.1 |
| 6,394,902 B1 | 5/2002 | Glavich et al. | 463/20 |
| 6,402,142 B1 | 6/2002 | Warren et al. | 273/149 R |
| 6,403,908 B2 | 6/2002 | Stardust et al. | 209/587 |
| 6,406,369 B1 | 6/2002 | Baerlocher et al. | 463/20 |
| 6,409,595 B1 | 6/2002 | Uihlein et al. | 463/29 |
| 6,413,162 B1 | 7/2002 | Baerlocher et al. | 463/20 |
| 6,425,824 B1 | 7/2002 | Baerlocher et al. | 463/16 |
| 6,446,864 B1 | 9/2002 | Kim et al. | 235/382 |
| 6,457,715 B1 | 10/2002 | Friedman | 273/274 |
| 6,460,848 B1 | 10/2002 | Soltys et al. | 273/149 R |
| 6,464,581 B1 | 10/2002 | Yoseloff et al. | 463/20 |
| 6,468,156 B1 | 10/2002 | Hughs-Baird et al. | 463/25 |

| | | | |
|---|---|---|---|
| 6,471,208 B2 | 10/2002 | Yoseloff et al. | 273/143 R |
| 6,502,116 B1 | 12/2002 | Kelly et al. | 708/250 |
| 6,508,709 B1 | 1/2003 | Karmarkar | 463/42 |
| 6,514,140 B1 | 2/2003 | Storch | 463/25 |
| 6,517,435 B2 | 2/2003 | Soltys et al. | 463/25 |
| 6,517,436 B2 | 2/2003 | Soltys et al. | 463/29 |
| 6,517,437 B1 | 2/2003 | Wells et al. | 463/30 |
| 6,520,857 B2 | 2/2003 | Soltys et al. | 463/29 |
| 6,527,271 B2 | 3/2003 | Soltys et al. | 273/148 R |
| 6,530,836 B2 | 3/2003 | Soltys et al. | 463/29 |
| 6,530,837 B2 | 3/2003 | Soltys et al. | 463/25 |
| 6,533,276 B2 | 3/2003 | Soltys et al. | 273/148 R |
| 6,533,662 B2 | 3/2003 | Soltys et al. | 463/25 |
| 6,533,664 B1 | 3/2003 | Crumby | 463/42 |
| 6,543,770 B1* | 4/2003 | Kaji et al. | 273/148 R |
| 6,561,897 B1 | 5/2003 | Bourbour et al. | 463/13 |
| 6,568,678 B2 | 5/2003 | Breeding et al. | 273/149 R |
| 6,579,180 B2 | 6/2003 | Soltys et al. | 463/25 |
| 6,579,181 B2 | 6/2003 | Soltys et al. | 463/25 |
| 6,582,301 B2 | 6/2003 | Hill | 463/11 |
| 6,588,750 B1 | 7/2003 | Grauzer et al. | 273/149 R |
| 6,588,751 B1 | 7/2003 | Grauzer et al. | 273/149 R |
| 6,595,857 B2 | 7/2003 | Soltys et al. | 463/25 |
| 6,599,185 B1 | 7/2003 | Kaminkow et al. | 463/16 |
| 6,629,889 B2 | 10/2003 | Mothwurf | 463/25 |
| 6,638,161 B2 | 10/2003 | Soltys et al. | 463/12 |
| 6,651,981 B2 | 11/2003 | Grauzer et al. | 273/149 R |
| 6,651,982 B2 | 11/2003 | Grauzer et al. | 273/149 R |
| 6,651,985 B2* | 11/2003 | Sines et al. | 273/309 |
| 6,652,379 B2 | 11/2003 | Soltys et al. | 463/22 |
| 6,655,684 B2 | 12/2003 | Grauzer et al. | 273/149 R |
| 6,663,490 B2 | 12/2003 | Soltys et al. | 463/25 |
| 6,676,127 B2 | 1/2004 | Johnson et al. | 273/149 R |
| 6,676,516 B2 | 1/2004 | Baerlocher et al. | 463/25 |
| 6,685,568 B2 | 2/2004 | Soltys et al. | 463/47 |
| 6,688,979 B2 | 2/2004 | Soltys et al. | 463/25 |
| 6,698,759 B2 | 3/2004 | Webb et al. | 273/292 |
| 6,712,693 B1 | 3/2004 | Hettinger | 463/20 |
| 6,712,696 B2 | 3/2004 | Soltys et al. | 463/25 |
| 6,722,974 B2* | 4/2004 | Sines et al. | 463/12 |
| 6,728,740 B2 | 4/2004 | Kelly et al. | 708/250 |
| 6,729,956 B2 | 5/2004 | Wolf et al. | 463/25 |
| 6,729,961 B1 | 5/2004 | Millerschone | 463/30 |
| 6,758,751 B2 | 7/2004 | Soltys et al. | 463/29 |
| 6,889,979 B2 | 5/2005 | Blaha et al. | 273/149 R |
| 6,955,599 B2* | 10/2005 | Bourbour et al. | 463/13 |
| 6,964,612 B2* | 11/2005 | Soltys et al. | 463/47 |
| 6,991,544 B2 | 1/2006 | Soltys et al. | 463/42 |
| 7,011,309 B2 | 3/2006 | Soltys et al. | 273/149 R |
| 7,029,009 B2 | 4/2006 | Grauzer et al. | 273/149 P |
| 7,065,513 B1* | 6/2006 | Bertrand et al. | 706/45 |
| 7,073,791 B2 | 7/2006 | Grauzer et al. | 273/149 R |
| 2002/0063389 A1* | 5/2002 | Breeding et al. | 273/292 |
| 2002/0068635 A1* | 6/2002 | Hill | 463/47 |
| 2002/0086727 A1 | 7/2002 | Soltys et al. | 463/22 |
| 2002/0147042 A1 | 10/2002 | Vuong et al. | 463/40 |
| 2002/0163125 A1 | 11/2002 | Grauzer et al. | 273/149 R |
| 2002/0165029 A1 | 11/2002 | Soltys et al. | 463/47 |
| 2002/0187821 A1 | 12/2002 | Soltys et al. | 463/11 |
| 2003/0032474 A1 | 2/2003 | Kaminkow | 463/25 |
| 2003/0036425 A1 | 2/2003 | Kaminkow et al. | 463/25 |
| 2003/0042673 A1* | 3/2003 | Grauzer et al. | 273/149 R |
| 2003/0054878 A1 | 3/2003 | Benoy et al. | 463/29 |
| 2003/0073498 A1 | 4/2003 | Grauzer et al. | 463/42 |
| 2003/0083126 A1 | 5/2003 | Paulsen | 463/25 |
| 2003/0104856 A1 | 6/2003 | Wolf | 463/16 |
| 2003/0173737 A1 | 9/2003 | Soltys et al. | 273/149 R |
| 2003/0176209 A1 | 9/2003 | Soltys et al. | 463/13 |
| 2004/0067789 A1 | 4/2004 | Grauzer et al. | 463/11 |
| 2004/0100026 A1 | 5/2004 | Haggard | 273/304 |
| 2004/0108255 A1 | 6/2004 | Johnson et al. | 209/547 |
| 2004/0147327 A1 | 7/2004 | Soltys et al. | 463/47 |
| 2004/0207156 A1 | 10/2004 | Soltys et al. | 273/292 |
| 2004/0224777 A1 | 11/2004 | Smith et al. | 463/47 |
| 2005/0012270 A1 | 1/2005 | Schubert et al. | 273/149 R |
| 2005/0026680 A1 | 2/2005 | Guruajan | 463/25 |
| 2005/0026681 A1 | 2/2005 | Grauzer et al. | 463/29 |
| 2005/0026682 A1 | 2/2005 | Grauzer et al. | 463/29 |
| 2005/0051955 A1 | 3/2005 | Schubert et al. | 273/149 R |
| 2005/0051965 A1 | 3/2005 | Gururajan | 273/292 |
| 2005/0054408 A1 | 3/2005 | Steil et al. | 463/11 |
| 2005/0062226 A1 | 3/2005 | Schubert et al. | 273/149 R |
| 2005/0062227 A1 | 3/2005 | Grauzer et al. | 273/149 R |
| 2005/0073102 A1 | 4/2005 | Yoseloff et al. | 273/292 |
| 2005/0093230 A1* | 5/2005 | Grauzer et al. | 273/149 R |
| 2005/0101367 A1 | 5/2005 | Soltys et al. | 463/12 |
| 2005/0121852 A1 | 6/2005 | Soltys et al. | 273/149 P |
| 2005/0137005 A1 | 6/2005 | Soltys et al. | 463/13 |
| 2005/0288083 A1 | 12/2005 | Downs, III | 463/11 |
| 2005/0288084 A1 | 12/2005 | Schubert | 463/11 |
| 2005/0288085 A1 | 12/2005 | Schubert et al. | 463/11 |
| 2006/0001217 A1 | 1/2006 | Soltys et al. | 273/292 |
| 2006/0027971 A1* | 2/2006 | Radhakrishnan | 273/309 |

FOREIGN PATENT DOCUMENTS

| | | |
|---|---|---|
| EP | 1 291 045 A2 | 3/2003 |
| GB | 2 246 520 A | 2/1992 |
| GB | 2 370 791 A | 7/2002 |
| GB | 2 380 143 A | 4/2003 |
| WO | WO 96/36253 | 11/1996 |
| WO | WO 00/62880 | 10/2000 |
| WO | WO 02/05914 A1 | 1/2002 |
| WO | WO 02/051512 A2 | 7/2002 |
| WO | WO 03/004116 A1 | 1/2003 |

OTHER PUBLICATIONS

U.S. Appl. No. 10/902,436, filed Jul. 29, 2004, Soltys et al.
U.S. Appl. No. 10/962,166, filed Oct. 8, 2004, Soltys et al.
U.S. Appl. No. 11/059,743, filed Feb. 16, 2005, Soltys et al.
U.S. Appl. No. 11/112,793, filed Apr. 21, 2005, Soltys et al.
U.S. Appl. No. 11/337,375, filed Jan. 23, 2006, Soltys et al.
U.S. Appl. No. 11/428,240, filed Jun. 30, 2006, Fleckenstein.
U.S. Appl. No. 11/428,244, filed Jun. 30, 2006, Soltys.
U.S. Appl. No. 11/428,249, filed Jun. 30, 2006, Fleckenstein.
U.S. Appl. No. 11/428,253, filed Jun. 30, 2006, Fleckenstein.
U.S. Appl. No. 11/428,258, filed Jun. 30, 2006, Fleckenstein.
U.S. Appl. No. 11/428,264, filed Jun. 30, 2006, Soltys.
U.S. Appl. No. 11/428,286, filed Jun. 30, 2006, Soltys et al.
U.S. Appl. No. 11/437,590, filed May 19, 2006, Soltys et al.
U.S. Appl. No. 11/478,360, filed Jun. 29, 2006, Fleckenstein.
U.S. Appl. No. 11/479,930, filed Jun. 30, 2006, Soltys et al.
U.S. Appl. No. 11/479,963, filed Jun. 30, 2006, Fleckenstein.
U.S. Appl. No. 11/479,991, filed Jun. 29, 2006, Soltys.
U.S. Appl. No. 11/480,273, filed Jun. 30, 2006, Soltys.
U.S. Appl. No. 11/480,275, filed Jun. 30, 2006, Fleckenstein.
U.S. Appl. No. 11/480,295, filed Jun. 29, 2006, Fleckenstein.
U.S. Appl. No. 11/480,321, filed Jun. 30, 2006, Soltys.
U.S. Appl. No. 11/480,345, filed Jun. 30, 2006, Fleckenstein.
U.S. Appl. No. 11/480,349, filed Jun. 30, 2006, Soltys et al.
U.S. Appl. No. 11/519,244, filed Sep. 11, 2006, Soltys et al.
U.S. Appl. No. 60/838,280, filed Aug. 17, 2006, Soltys et al.
U.S. Appl. No. 60/847,331, filed Sep. 26, 2006, Shayesteh.
Burke, A., "Tracking the Tables," reprinted from *International Gaming & Wagering Business*, Aug. 2003, 4 pages.
Gros, R., "All You Ever Wanted to Know About Table Games," reprinted from *Global Gaming Business*, Aug. 1, 2003, 2 pages.
Snyder, A., "The High-Tech Eye," excerpt from *Blackjack Forum*, Spring 1997, accessed Dec. 21, 2005, from Casino Software & Services, LLC, URL = http://www.casinosoftware.com/bj_forum.html.
Terdiman, D., "Who's Holding the Aces Now?", reprinted from *Wired News*, Aug. 18, 2003, 2 pages.

Ward, K., "BJ Tracking System has Players Down for the Count," *Gaming Today*, Mar. 5, 2002, accessed Dec. 21, 2005, from Casino Software & Services, LLC, URL = http://www.casinosoftware.com/gaming_today.html.

Winkler, C., "Product Spotlight: MindPlay," reprinted from *Gaming and Leisure Technology*, Fall 2003, 2 pages.

Bally TMS, "MP21—Automated Table Tracking/Features," 2 pages, Nov. 2005.

Bally TMS, "MPBacc—Intelligent Table Tracking/Features," 2 pages, Nov. 2005.

Bally TMS, "MPBacc—Specifications/Specifications," 2 pages, Nov. 2005.

Bravo Gaming Systems, "Casino Table Wager Analysis and Player Tracking System—Table Operations/Unique Features," accessed Apr. 11, 2005, URL = http://www.genesisgaming.com, 4 pages.

Casino Software & Services, LLC, accessed Aug. 25, 2006, URL = http:/casinosoftware.com/home.html, 6 pages.

International Guild of Hospitality & Restaurant Managers, "Shuffle Master, Inc. (NasdaqNM:SHFL)," accessed Dec. 30, 2003, URL = http://hospitalityguide.com/Financial/Casinos/Shuffle.htm, 3 pages.

Mikohn, "Mikohn Tablelink—The Industry's Premier Table Tracking Solution Delivers Improvements Straight to the Bottom Line," 2 pages, before Jan. 1, 2004.

Mikohn, "Tablelink™, The New Standard in Table Games," before Jan. 1, 2004, 14 pages.

Plaintiff's Declaration of Lawrence Luciano in Opposition to Shuffle Master's Motion for Preliminary Injunction, *Card, LLC* v. *Shuffle Master, Inc.*, D. Nev. (No. CV-N-03-0244-ECR-(RAM)), Nov. 24, 2003.

Shuffle Master, Inc., "Shuffle Master Announces New Products; Intelligent Table System to Be Debuted at G2E," Sep. 10, 2003, 2 pages.

* cited by examiner

METHOD, APPARATUS AND ARTICLE EMPLOYING MULTIPLE MACHINE-READABLE INDICIA ON PLAYING CARDS

BACKGROUND OF THE INVENTION

1. Field of the Invention

The present description generally relates to the automated gaming systems and in particular automated systems for card games.

2. Description of the Related Art

Casinos and other forms of gaming are a multi-billion dollar, worldwide industry. Typically, a customer exchanges currency or some form of credit for a casino's wagering tokens, commonly known as chips. The customer places the chips as wagers at various table games, for example card games such as Blackjack or twenty-one, Hi/Low, Poker and LET IT RIDE®. The game operator, such as a dealer, pays out winning wagers with additional chips based on the set of odds for the particular game. The dealer collects the customer's wagered chips for losing wagers. The odds of each game slightly favor the casino, so on average the casino wins and is profitable.

Card games are a well-known form of recreational entertainment. Games are typically played with one or more decks of cards, where each deck typically includes 52 cards of four suits (i.e., hearts, diamonds, clubs, and spades), each suit including 14 cards of varying rank (i.e., 2–10, Jack, Queen, King and Ace). Card games may, or may not, include wagering based on the game's outcome. One popular card game is known as blackjack or twenty-one. In blackjack, one or more players compete against the dealer. The players attempt to collect a hand having a total value equal to, or as close to 21, without going over. The value of the hand is determined by the rank of the card. Thus, cards having rank 2–10 have the value 2–10 respectively. Face cards (i.e., Jack, Queen, King) each have the value 10, while Aces can have the value 1 or 10 at the player's discretion. An initial hand of two cards having the value of 21 (i.e., an Ace plus a 10 or a face card) is referred to as a natural "21", or blackjack, and beats other hands with the value of 21. Suits have no bearing on the game of blackjack.

Card games are particularly popular in casinos and other gaming establishments. Players wager large sums of money while playing card games, thus, it is desirable to ensure that those playing the game are not cheating, for example by substituting one or more cards into the deck or hand, or marking cards. It is also desirable to ensure that those playing the game are not using various prohibited strategies, such as card counting. Further, it is desirable to monitor the game in a relatively unobtrusive manner to allow casino customers to feel comfortable in their surroundings.

BRIEF SUMMARY OF THE INVENTION

In one aspect, a device for identifying playing cards in a stack of playing cards includes a first card support surface to supportingly engage at least a portion of a long edge of each of a number of playing cards in the stack of playing cards, a second card support surface extending at an angle to the first card support surface to supportingly engage at least a portion of a short edge of each of the number of playing cards in the stack, and a third card support surface for engagedly supporting a surface of an outermost one of the playing cards in the stack, the third card support surface forming a first obtuse angle with the first card support surface and a second obtuse angle with respect to the second card support surface, the first, the second and the third card support surfaces forming a receptacle sized and dimensioned for receiving at least a portion of the stack of playing cards, and a reading mechanism positioned to read a first indicia extending along a long edge of the playing card and a second indicia extending along a short edge of the playing card.

In another aspect, a gaming table for playing a card game includes a playing surface, a receptacle mounted in the playing surface of the gaming table, the receptacle sized and dimensioned for receiving at least a portion of a set of playing cards, the receptacle having a first card support surface to supportingly engage at least a portion of the first edge of each of a number of playing cards, and a second card support surface extending on an angle to the first card support surface to supportingly engage at least a portion of the second edge of each of the number of playing cards, and a third card support surface to supportingly engage at least a portion of a surface of one of the playing cards when the set of playing cards are stacked in the receptacle, a first window formed in the first card support surface to expose at least a portion of the first edge of each of at least some of the number of playing cards and a second window formed in the second card support surface to expose at least a portion of the second edge of each of at least some of the number of playing cards, and at least a first reader having at least a portion of the first field of view aligned with at least the first window.

In another aspect a device for identifying playing cards in the stack of playing cards includes a card support means for supportingly engaging at least a portion of the number of playing cards in the stack of playing cards to expose the first information carrying portion along the first edge of each of the playing cards and to expose the second information carrying portion along the second edge of each of the playing cards, and reading means for reading a first information encoding indicia the first information carrying portion and the second information encoding indicia the second information carrying portion of each of the number of playing cards.

In yet another aspect, a method of reading information from playing cards, includes supportingly engaging a first edge of the first set of playing cards at a first angle with respect to a horizontal table surface, supportingly engaging a second edge of the set of playing cards at a second angle with respect to the horizontal table surface, supportingly engaging a surface of an outermost one of the playing cards at a third angle with respect to the horizontal table surface to expose a first information carrying portion along the first edge of each of the playing cards and to expose a second information carrying portion along the second edge of each of the playing cards, and reading at least one of the first and the second information carrying portions of at least one of the playing cards.

In even another aspect a device for identifying playing cards in a set of playing cards includes receptacle sized and dimensioned to receive at least a portion of the set of playing cards with a first edge of each of the playing cards aligned in a first area and with a second edge of the playing aligned in a second area, a first reader having a first field of view extending over at east a potion of the first are, and a second reader having a second field of view extending over at least a portion of the second area.

In a further aspect, a device for identifying playing cards includes receptacle sized and dimensioned for receiving at least a portion of a set of playing cards, the receptacle having a first card support surface to supportingly engage at least a portion of a first edge of each of a number of playing cards in the set of playing cards and a second card support surface extending at an angle to the first card support surface to supportingly engage at least a portion of the second edge of each of the number of playing cards in the set of playing cards, and a third playing card support surface to supportingly engage at least a portion of the surface of one of the playing cards when the set of playing cards are stacked in the receptacle, a first window formed in the first card support surface to expose at least a portion of the first edge of each of at least some of the number of playing cards and a second window formed in the second card support surface to expose at least a portion of the second edge of each of at least some of the number of playing cards, and at least a first reader having a first field of view, at least a portion of the first field of view aligned with at least a first window.

In yet a further aspect, a method of identifying playing cards includes for each of a number of playing cards, reading a first machine-readable indicia from respective playing cards, and for each of the number of playing cards reading a second machine-readable indicia from respective playing card. In an additional aspect, the method may include determining an ordered sequence of the playing cards based on at least one of the first and the second machine-readable indicia read from the playing cards. In an additional alternative aspect, the method may include for each of the first machine-readable indicia read from the playing cards, attempting to decode a set of data representing the first machine-readable indicia, attempting to decode a set of data representing the second machine-readable indicia read from a same one of the playing cards as the first machine-readable indicia if the attempt to decode the set of data representing the first machine-readable indicia is unsuccessful, and determining an ordered sequence from the decoded sets of data representing the first and second machine-readable indicia. In yet another additional or alternative embodiment, the method may include for each of the first machine-readable indicia read from the playing cards, decoding a set of data representing the first machine-readable indicia, for each of the second machine-readable indicia from the playing cards, decoding of a set of data representing the second machine-readable indicia, and for each of at least some of the playing cards, verifying an authenticity of the playing card based on the decoded first machine-readable indicia and the decoded second machine indicia read from the same one of a playing cards as the first machine-readable indicia.

In even a further aspect, a computer readable media containing instructions for causing a computer to identify playing cards by, for each of a number of playing cards, reading a first machine-readable indicia from the respective playing cards, and for each of the number of playing cards reading a second machine-readable indicia from respective playing cards.

In a further aspect, a method of reading information from playing cards, includes exposing a first information carrying portion along the first edge of each of the number of playing cards, exposing a second information carrying portion along the second edge of each of the number of playing cards, and reading at least one of the first and the second information carrying portions of at least one of the number of playing cards.

In even further aspect, a method of determining the validity of playing cards, includes decoding a first machine-readable indicia carried by playing cards give a first value, decoding a second machine-readable indicia carried by the playing cards to get a second value, and determining the validity of the playing card based on the first and second values. And in an additional aspect, determining a validity of a playing card based on firs and second value, may include determining whether the first and second values match, or determining whether the first and second values successfully solve the defined algorithm, or determining whether the first and second values are mapped to one another in a database, or determining whether the first value is mathematically related to the second value.

In yet a further aspect a computer readable media containing instructions for causing a computer to verify playing cards, by decoding a first machine-readable indicia carried by a playing card to get a first value, decoding a second machine-readable indicia carried by the playing card to get a second value, and determining the validity of the playing card based on the first and second values.

In yet another aspect, a method of verifying playing cards, includes decoding a first machine-readable indicia carried by a playing card to get a first value, decoding a second machine-readable indicia carried by the playing card to get a second value, and determining if a predefined algorithm solves for the first and second values.

In an additional aspect, a computer readable media contains instructions for causing a computer to verify playing cards, by decoding a first machine-readable indicia carried by a playing card to get a first value, decoding a second machine-readable indicia carried by the playing card to get a second value, and determining if a predefined algorithm solves for the first and second values.

In yet a further aspect, a method of producing playing cards includes determining a number of sets of values that solve a predefined algorithm, where each set of values contains at least two values, encoding the first value of one of the sets of values in the first machine-readable indicia on the playing card, and encoding the second value of the one of the sets of values in a second machine-readable indicia on the playing card.

In a yet even another aspect a computer readable media contains instructions for causing a computer to identify playing cards, by determining a number of sets of values that solve a predefined algorithm, where each set of values contains at least two values, according to the first value of one of the sets of values in the first machine-readable indicia on the playing card, and encoding the second value of one of the sets of values in the second machine-readable indicia on the playing card.

In yet even a further aspect, a set of playing cards, includes a number of playing cards, each of the playing cards bearing a first machine-readable indicia extending along the first edge of the playing card, and a second machine-readable indicia extending along the second edge of the playing card, where a defined relationship exists between the first and the second machine-readable indicia.

BRIEF DESCRIPTION OF THE SEVERAL VIEWS OF THE DRAWING(S)

In the drawings, identical reference numbers identify similar elements or acts. The size and relative positions of elements in the drawings are not necessarily drawn to scale. For example, the shapes of various elements are not drawn to scale, and some of these elements are arbitrarily enlarged and positioned to improve drawing legibility. Further, the particular shapes and the elements is drawn or not intended to convey any information regarding the actual shape of the particular elements, and have been solely selected for their ease and recognition in the drawings.

DETAILED DESCRIPTION OF THE INVENTION

In the following description, certain specific details are set forth in order to provide a thorough understanding of various embodiments of the invention. However, one skilled in the art will understand that the invention may be practiced without these details. In other instances, well-known structures associated with cameras, imagers, scanners, optics, computers, computer networks, data structures, databases, and networks such as the Internet, have not been describe in detail to avoid unnecessarily obscuring the descriptions of the embodiments of the invention.

Unless the context requires otherwise, throughout the specification and claims which follow, the word "comprise" and variations thereof, such as "comprises" and "comprising" are to be construed in an open, inclusive sense, that is as "including but not limited to."

Figure 1:
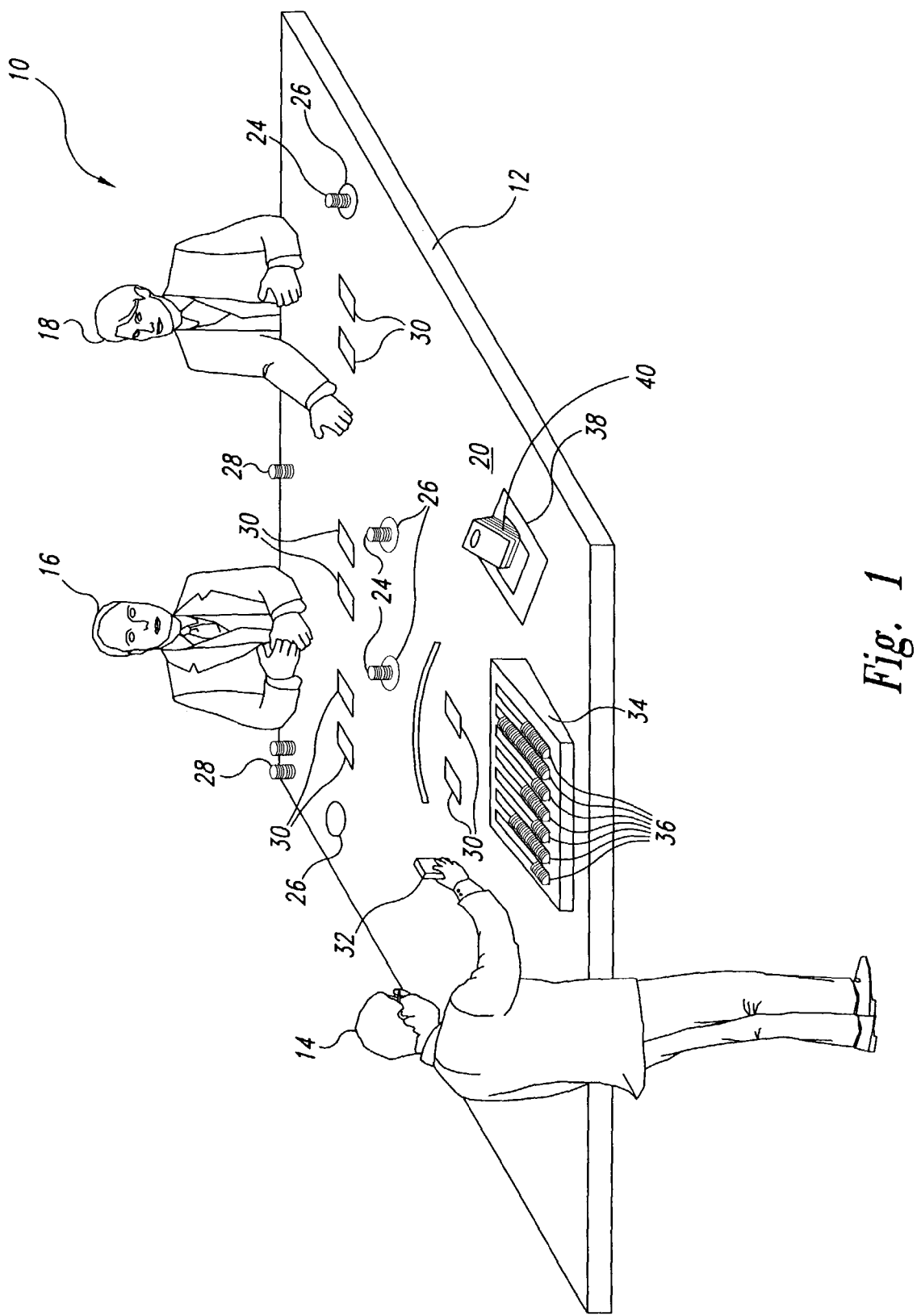
FIG. 1 is a schematic diagram showing an environment in which an embodiment of the invention can operate, including a dealer and players at a gaming table which includes a chip tray and a card reader.

FIG. 1 shows a gaming environment 10 including a gaming table 12 at which a dealer 14 and players 16, 18 play a card game, for example blackjack or twenty-one. The gaming table 12 has a playing surface 20 on which playing cards 22 and wagers 24 are placed. The gaming table 12 may include markings identifying specific areas of the table, for example areas for placing wagers commonly referred to as betting circles 26. Wagers are placed by moving one or more betting tokens or chips 28 into the appropriate betting circle 26.

The dealer 14 may deal cards 32 to each of the players 16, 18 and to the dealer's self For example, in the game of blackjack the dealer 14 successively deals a first card to each of the players 16, 18, in order from the dealer's left to right, and ending with the dealer's self 14. The dealer 14 then deals a second card to each of the players 16, 18, from the dealer's left to right, again ending with the dealer's self 14. The first and second cards form the respective initial hands 30 of players 16, 18 and the dealer 14. In some gaming environments 10, the dealer 14 deals from a set of cards 32 held in the dealer's hand. In other gaming environments 10, the dealer deals playing cards held in a card holder or shoe, by removing the playing cards from the card shoe one at a time.

In typical gaming environments 10, a bank or chip tray 34 on the gaming table 12 provides storage for holding the house's (e.g., casino's) chips 36. The chip tray 34 allows the dealer 14 to collect or "hold" losing wagers and pay out winning wagers. Chips 36 in the chip tray 34 are generally arranged in columns and may be organized by denomination.

The illustrated gaming environment 10 includes a card reader 38, for reading respective machine-readable indicia from each of a number of playing cards 40 inserted into the card reader 38, as described in detail below.

Figure 2:
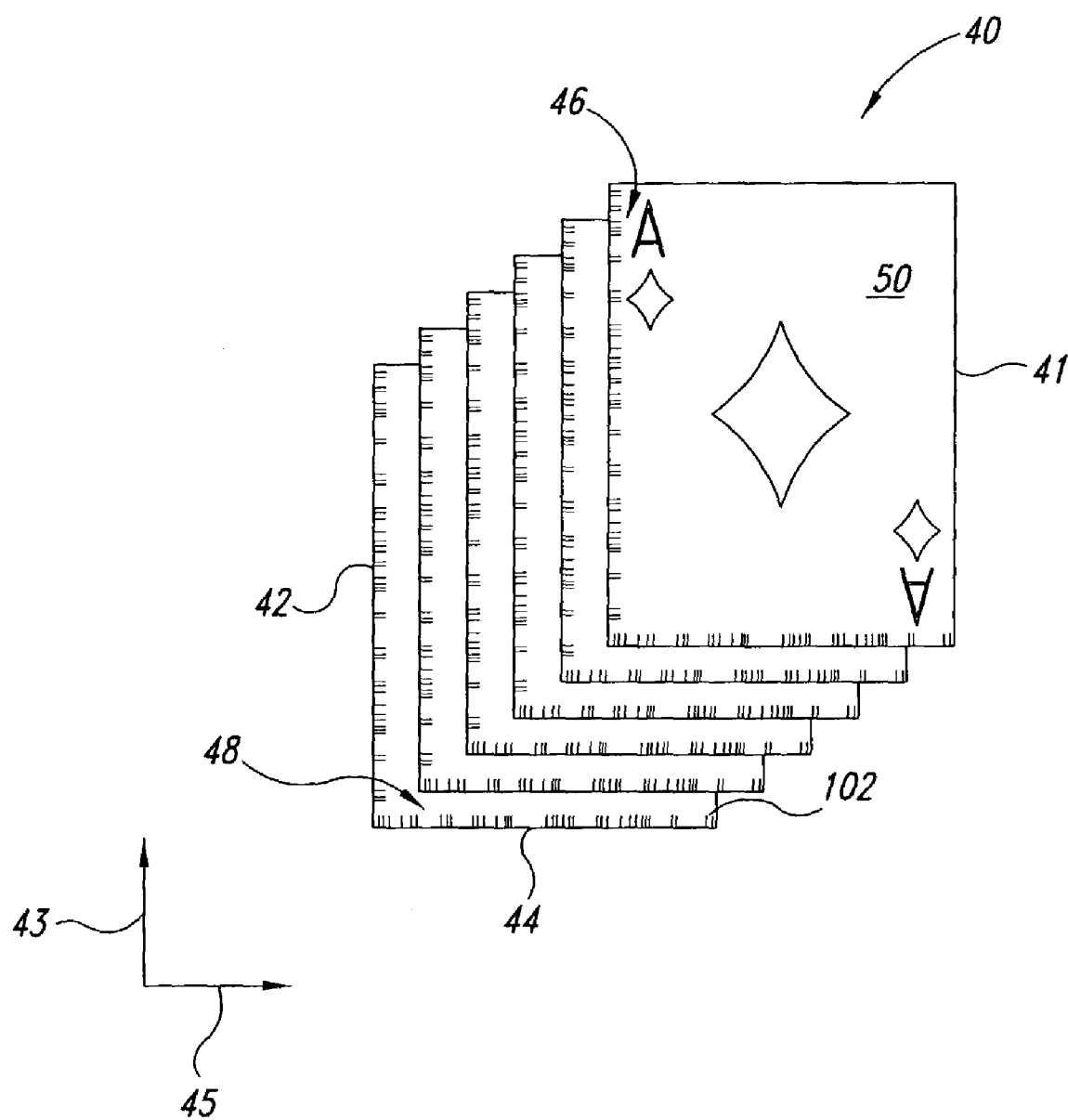
FIG. 2 is a front plan view of a stacked set of playing cards, each of the playing cards carrying two machine-readable indicia on a face of the playing cards.

FIG. 2 shows an exemplary set of playing cards 40 which may be inserted or temporarily stored in the card reader 38 as a stack. The set of cards 40 may be one or more decks of cards, or may be a lesser or greater number of cards selected from one or more decks of playing cards. (Only six playing cards are illustrated for ease of presentation.) When placed in the card reader 38 each of the playing cards 41 in the stack of playing cards 40 are shifted or staggered with respect to adjacent playing cards in the set along two perpendicular axes 43, 45, corresponding to a long and short edge 42, 44, respectively, of the playing cards 40, as illustrated in FIG. 2. (The amount of shift or stager is exaggerated in FIG. 2 for clarity of presentation. In use, typically less than ⅛ inch of the edges 42, 44 of each playing card 41 will be exposed.)

As illustrated in FIG. 2, a first information carrying portion bearing a first machine-readable indicia 46 and a second information carrying portion bearing a second machine-readable indicia 48 are exposed. The exposed portions are preferably proximate the edges 42, 44 of the playing card 41. The exposed portions may be an end portion along an edge of the face 50 (i.e., surface bearing the rank and suit markings) or the back (i.e., surface bearing a uniform marking for each playing card in the set). Placing the machine-readable indicia on the face 50 of the playing card may make it more difficult for unauthorized people to view or gain access to the information encoded in the machine-readable indicia.

The machine-readable indicia 46, 48 can take the form of barcode, area or matrix code, or stack code symbols selected from respective symbologies to encode identifying information such as the rank and suit of the card, a unique serial number, and/or information about the set of cards 40 to which the playing card 41 belongs. For example, as shown in FIG. 2, the playing cards 40 can carry barcode symbols along two edges 42, 44 on the faces of the playing cards. Lookup tables or an algorithm can relate a unique serial number encoded in one or both the machine-readable indicia 46, 48 to one another, or to other identifying information, such as the rank, suit, casino, manufacturer of the card and/or card set 40. Use of a proprietary machine-readable symbology can enhance security and efficiency. Encryption can also enhance security, for example, encrypting the unique serial numbers or other information before encoding the information into the machine-readable indicia 46, 48. The machine-readable indicia 46, 48 can also take advantage of error correction, to discover and correct errors. Error correction techniques, for example Reed-Solomon error correction are generally known in the automatic data collection ("ADC") arts. While visibly illustrated in FIG. 2, the machine-readable indicia 46, 48 can be printed using an ink that is not typically visible to humans, such as an ink that is only visible in the infrared or ultraviolet portions of the electromagnetic spectrum.

The particular embodiment illustrated has a number of reading and securing advantage over other embodiments. Printing the machine-readable indicia 46, 38 in invisible ink makes unauthorized detection and reading of the machine-readable indicia 46, 48 difficult, and also makes the deck marking unobtrusive to players 16, 18 (FIG. 1). Printing the machine-readable indicia 46, 38 on the face 50 of each playing card 41 of the set 40 makes it difficult for someone other than the card holding player 16, 18 to read, since in many games the cardholding player 16, 18 shields the face 50 of the playing cards 41 they hold from view to hide the rank and suit markings in situations where such is important. Often protecting the secrecy of the rank and suit is not important, such as in some versions of blackjack where playing cards 41 are dealt face up. Locating the machine-readable indicia 46, 48 on or at the edges 42, 44 of the playing card 41, makes it easy to expose the machine-readable indicia 46, 48 on all of the playing cards in the set 40 at a same time, without requiring a large amount of space in the card reader 38. Employing machine-readable indicia 46, 48 on two edges 42, 44, allows for redundancy and/or security not otherwise available for playing cards marked with a single machine-readable indicia. Additionally, or alternatively, employing multiple machine-readable indicia 46, 48 per card, may permit a substantially larger amount of information to be stored on any given playing card 41.

FIGS. 3–9 show the various components forming the card reader 38. The particular illustrated embodiment is intended for mounting into an opening (not shown) in the surface 20 (FIG. 1) of the game table 12, although the teachings herein are also applicable to a card reader which may be placed on the surface 20 of the gaming table 12.

Figure 3:
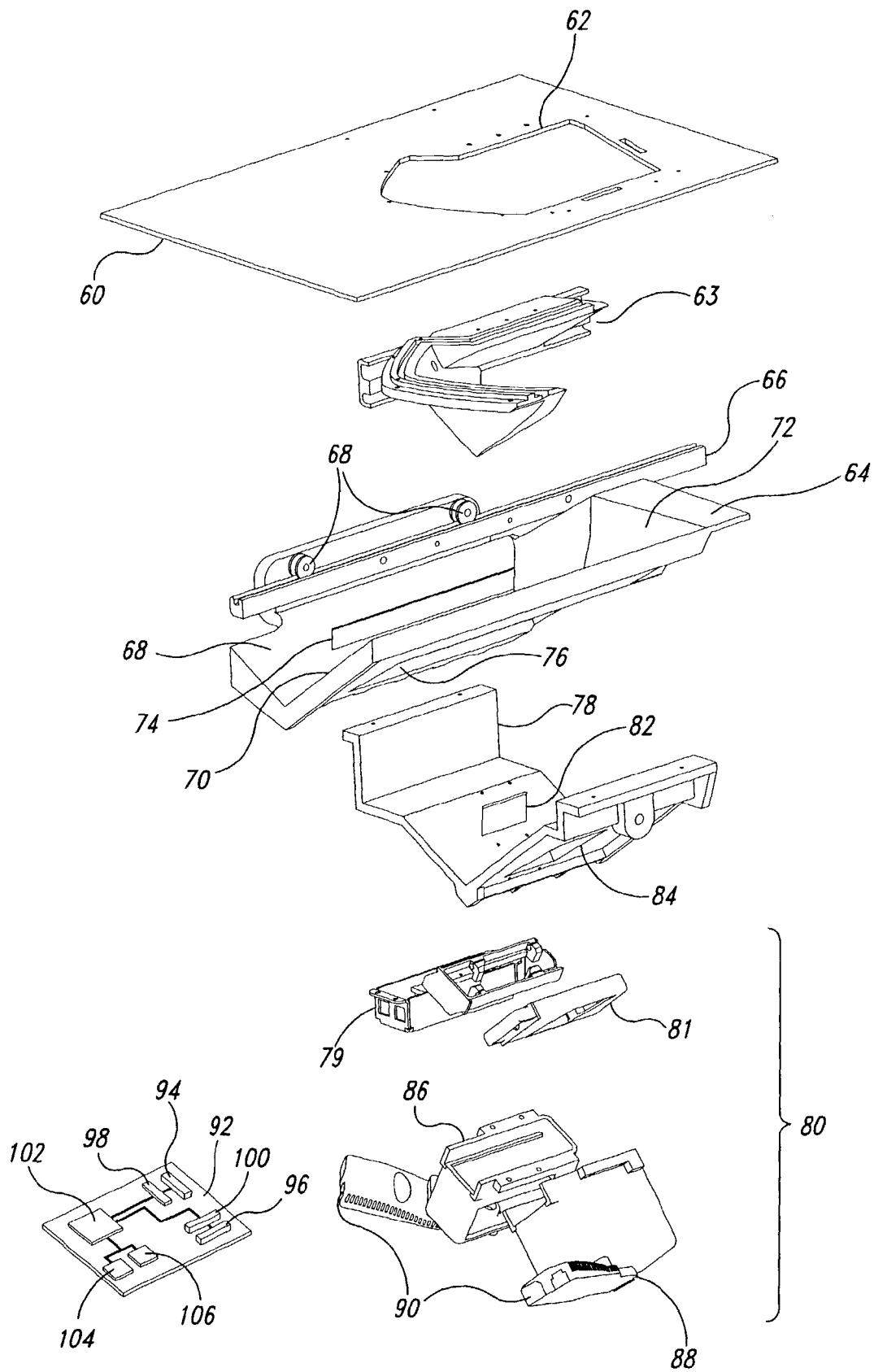
FIG. 3 is an exploded view of the card reader of FIG. 1.
Figure 4:
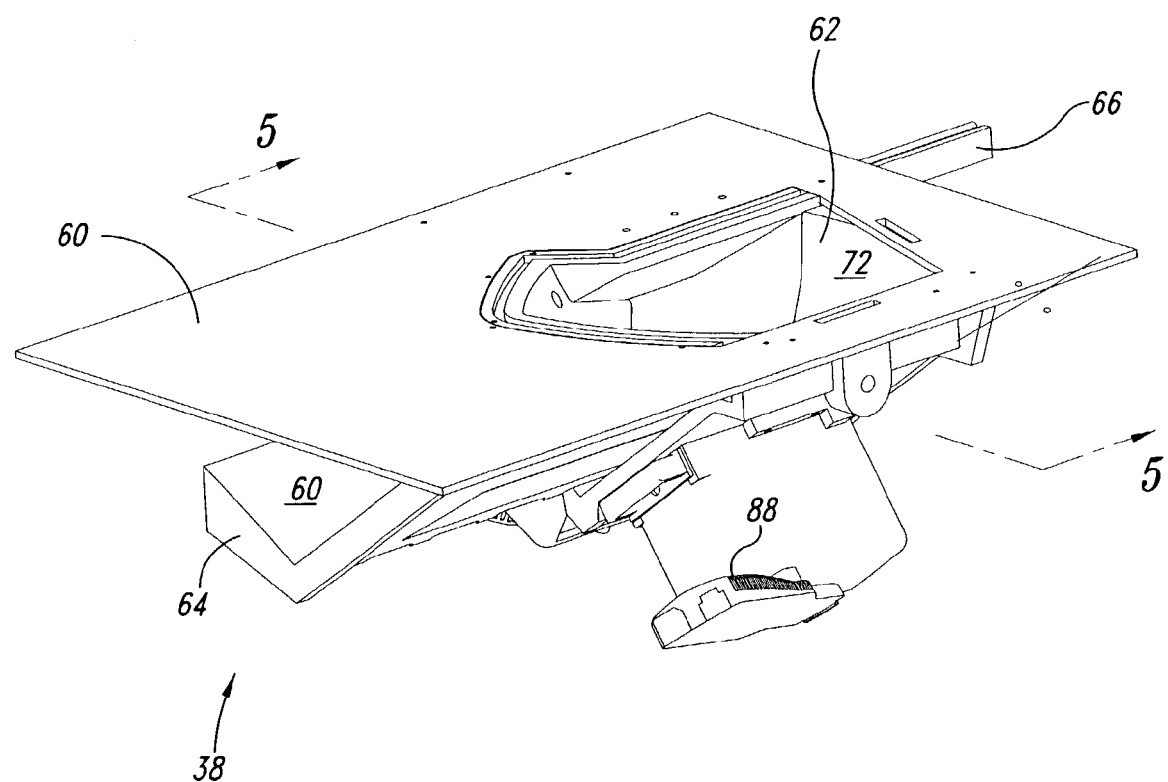
FIG. 4 is a top, front right isometric view of the card read of FIG. 3.

As seen in FIGS. 3 and 4, the card reader 38 includes a cover 60 for covering the opening (not shown) in the gaming table 12 into which the remainder of the card reader 38 is mounted. The cover 60 includes an aperture 62 sized and dimensioned to receive the set of playing cards 40.

The card reader 38 includes a receptacle 64 for holding and positioning the playing cards 40. The receptacle 64 is coupled to a rail 66 for axial movement, for example, by way of one or more rollers 68 or by a suitable sliding mechanism. The receptacle 64 includes a first card support surface 68 for supportingly engaging a first edge 44 (FIG. 2) of each of the playing cards 41 in the set of playing cards 40, a second card support surface 70 for supportingly engaging a second edge 42 (FIG. 2) of each of the playing cards in the set of playing cards 40, and a third card support surface 72 for supportingly engaging a surface (i.e. face or back) of an exterior or outer most playing card 41 in the set of playing cards 40.

Figure 5:
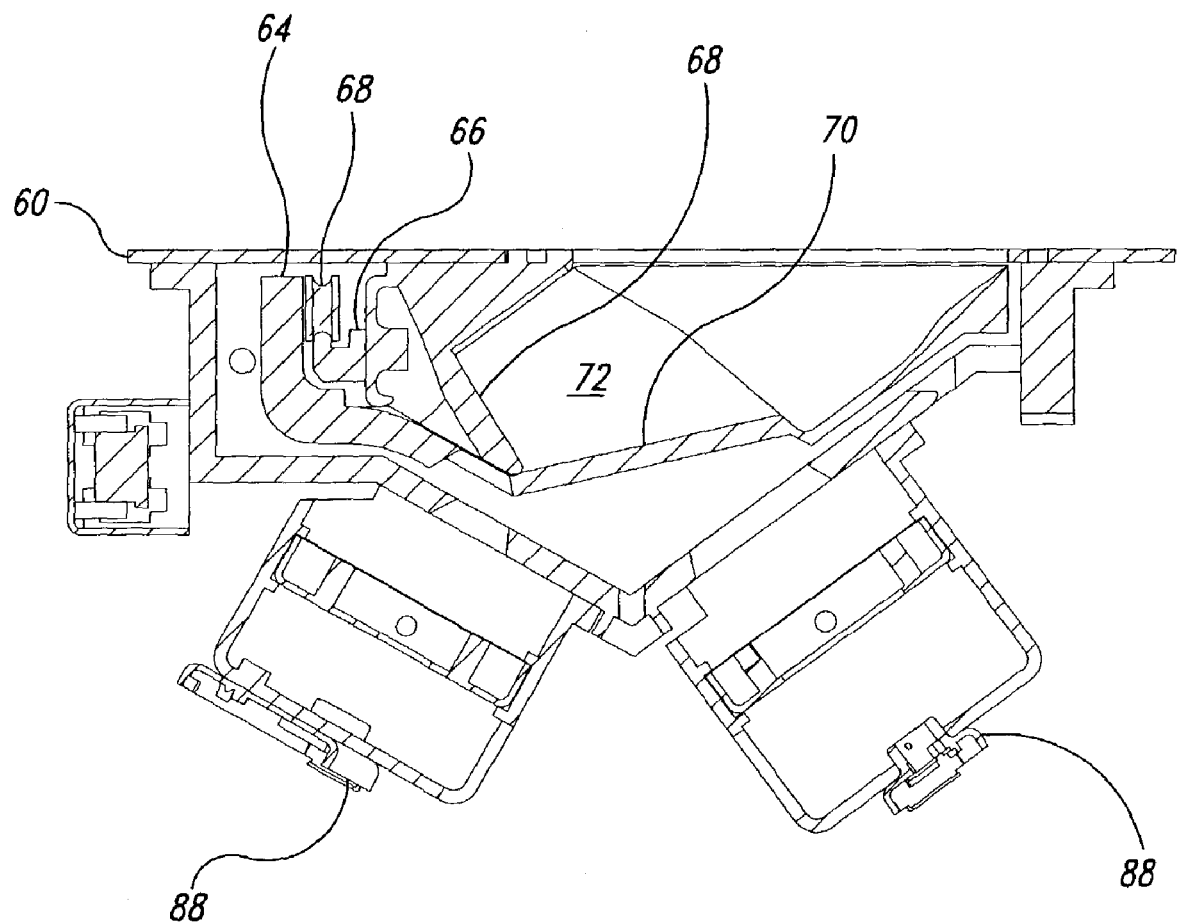
FIG. 5 is a cross-sectional view of the card reader of FIG. 4 taken along section line 5 of FIG. 4.
Figure 6:
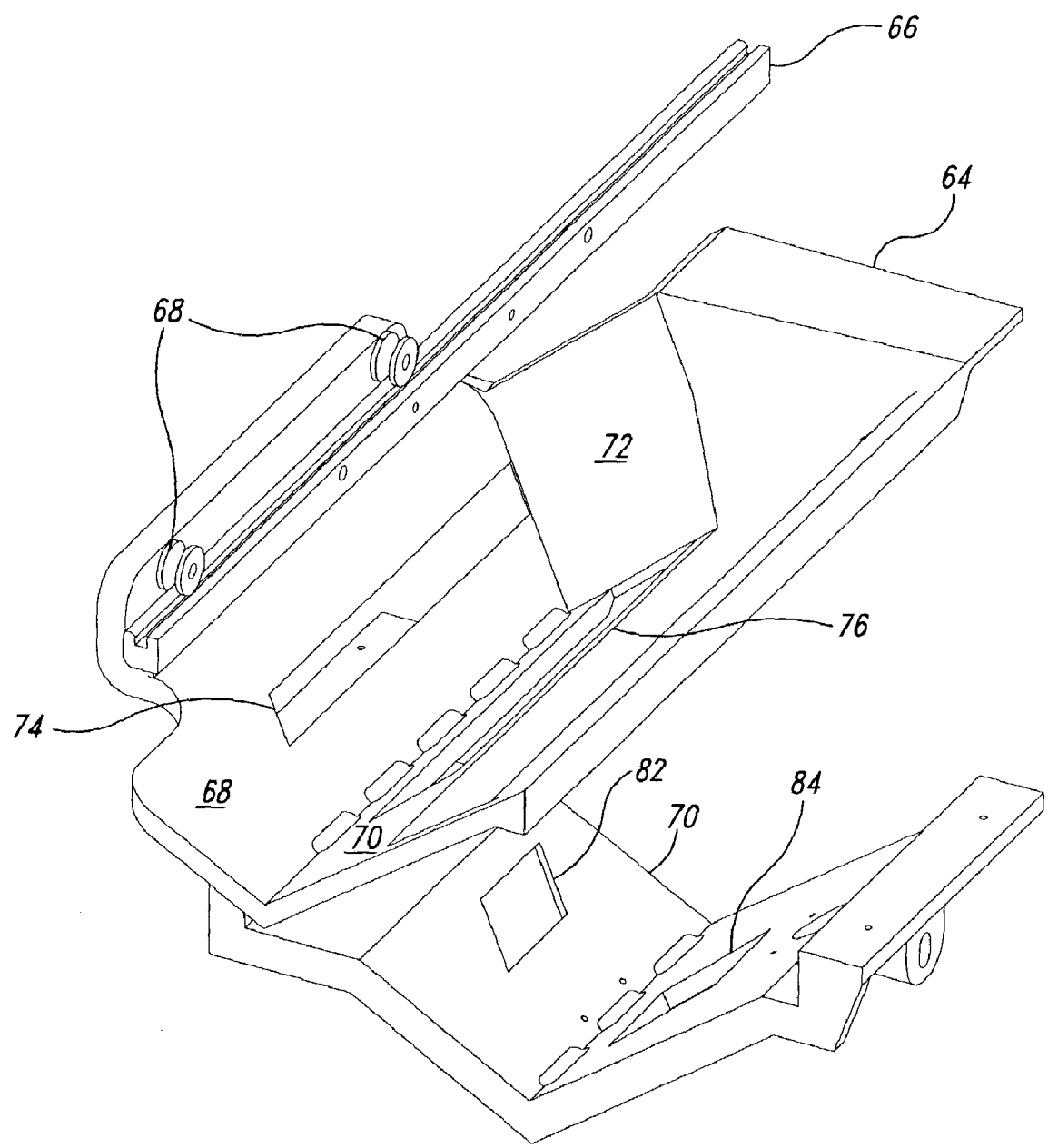
FIG. 6 is a top, front, right isometric partial view of the card reader illustrating the relationship between a receptacle and a reading mechanism mounting bracket.
Figure 7:
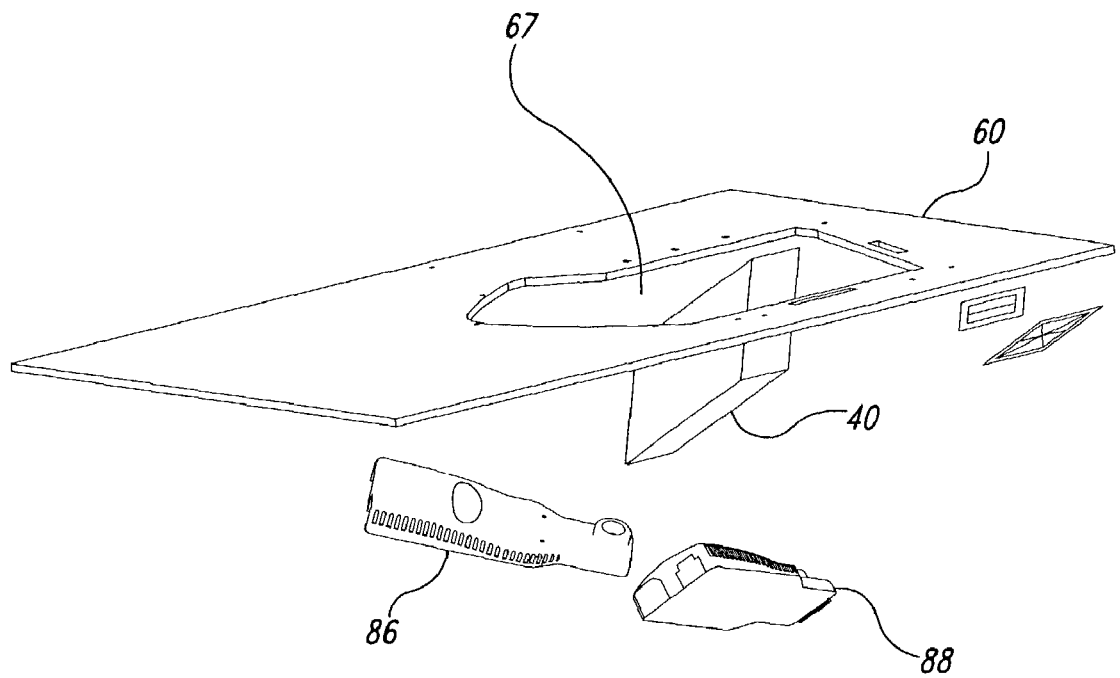
FIG. 7 is a top, front, right isometric partial view of the card reader of FIG. 4 and a set of playing cards, illustrating a geometric relationship between the playing cards and a first and second readers of a reading mechanism.
Figure 8:
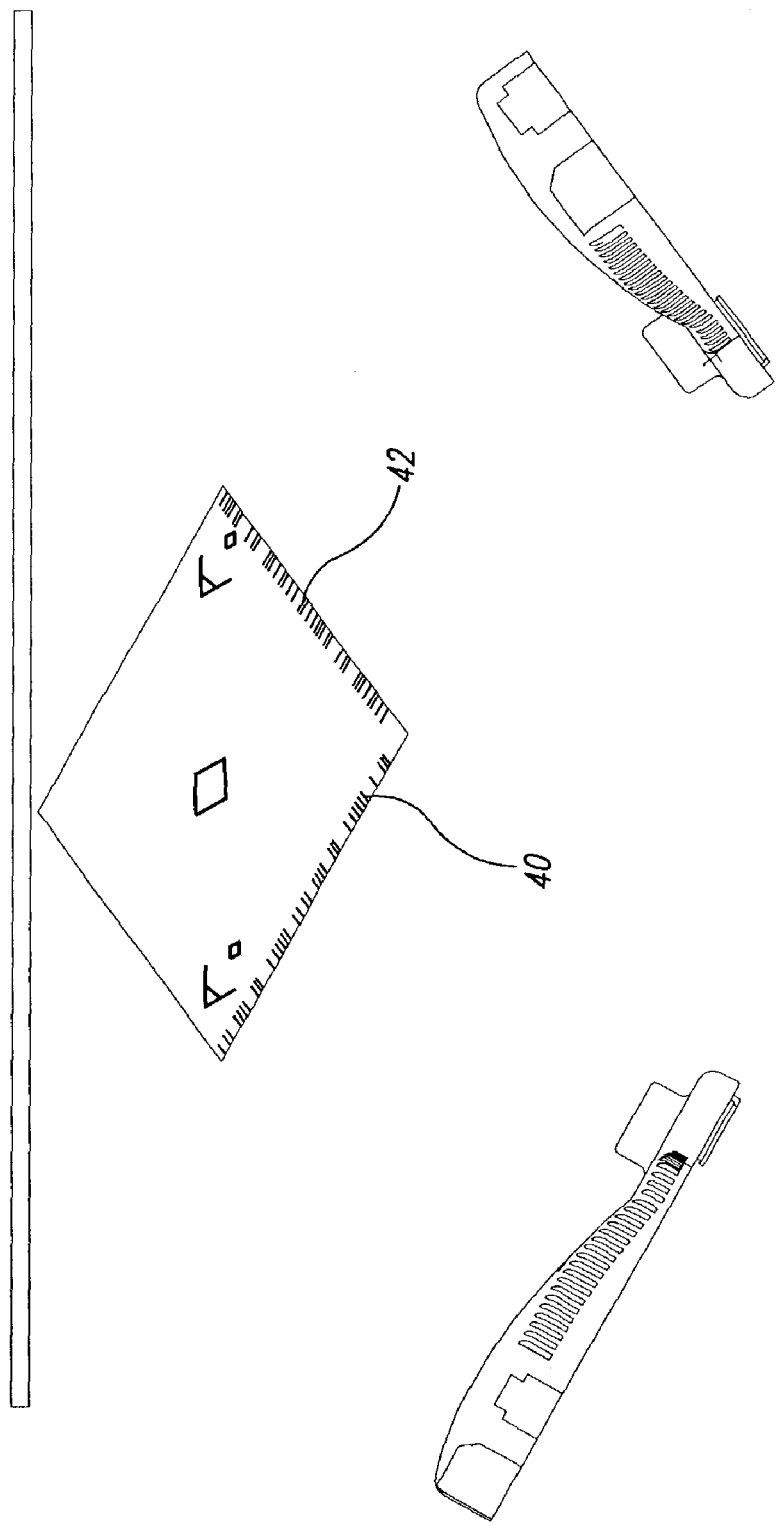
FIG. 8 is an isometric view of one of the cards, illustrating an orientation of the machine-readable indicia and the first and second readers.

As best illustrated in FIGS. 5 and 6, the third card support surface 72 forms an obtuse angle with the first card support surface 68 and the second card support surface 70, the receptacle 64 being sized and dimensioned for receiving at least a portion of the stack of playing cards 40. Also as best illustrated in FIGS. 5 and 6, the second card support surface 70 forms an obtuse angle with respect to the first card support surface 68. Each of the first, the second and third card support surfaces 68, 70, 72 are angled with respect to the horizontal table surface 20 of the gaming table 12 when the card reader 38 is mounted in or carried by the gaming table 12. The angles formed between the card support surfaces 68, 70, 72, in cooperation with the force of gravity which is generally normal to the table surface 20, cause the stack or set of cards 40 to become shifted or staggered along the two axes 43, 45 (FIG. 2) to expose the information bearing portions of each playing card 41 in the set of playing cards 40, as best illustrated in FIGS. 7 and 8.

With continuing reference to FIGS. 3 and 4, the receptacle 64 includes a first window 74 formed in the first card supporting surface 68 and a second window 76 formed in the second card supporting surface 70 to provide a view of the information bearing portions of the playing cards 40 on the other side of the card supporting surfaces 68, 70 from the card receiving portion of the receptacle 64. These windows 74, 76 can take the form of simple openings or apertures, or may include coverings that are transparent in the appropriate portion of the electromagnetic spectrum (e.g., white, infrared, or ultraviolet light) based on the visibility of the particular machine-readable indicia 46, 48.

The card reader 38 includes a reading mechanism mounting bracket 78 for mounting a reading mechanism 80 to the receptacle 64. The mounting bracket 78 includes first and second windows 82, 84 which align with the windows 74, 76, respectively, in the receptacle 64 for providing an unobstructed view of the information carrying portions of each of a number of playing cards 41 in the set of playing cards 40 when the playing cards 40 are positioned in the card receiving portion of the receptacle 64.

The reading mechanism 80 can take any of a variety of forms suitable for acquiring machine-readable indicia 46, 48. In one embodiment, the reading mechanism 80 includes a first and a second reader 86, 88, respectively, each reader 86, 88 having a field-of-view aligned with the respective pair of windows, 74, 82 and 76, 84 to align the fields-of-view with respective ones of the prospective positions of the information bearing portions of the set of playing cards 40 when set of playing cards 40 are inserted in the receptacle 64.

In another embodiment, the reading mechanism 80 may include a single reader 86 along with optics for aligning a first portion of the field-of-view of the reader 86 with the prospective position of the first information bearing portion of the set of playing cards 40 and a second portion of the field-of-view of the reader 86 with the prospective position of the second information bearing portion of the set of playing cards 40 when set of playing cards 40 are inserted in the receptacle 64. Suitable optics may include one or more mirrors and/or prisms.

Figure 9:
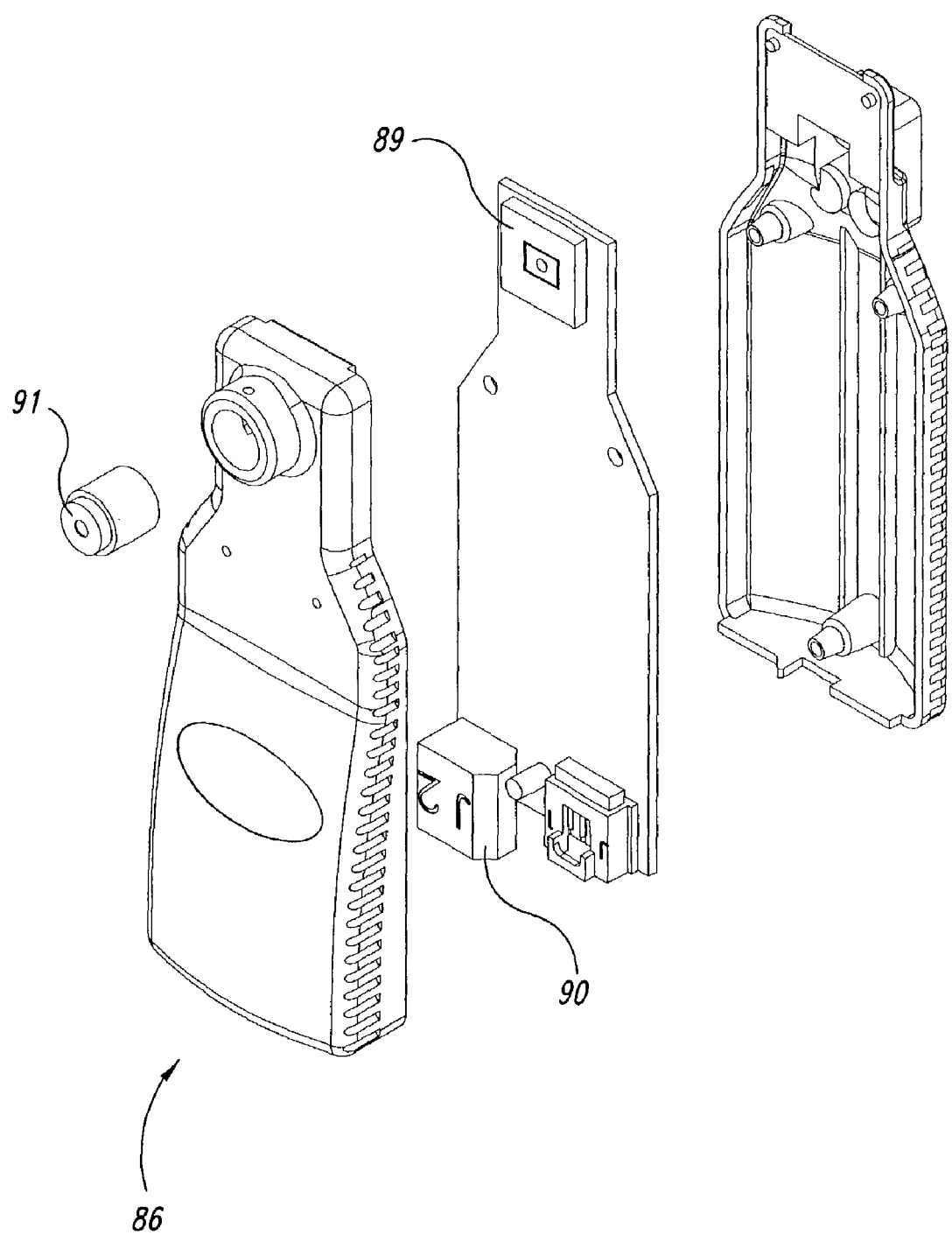
FIG. 9 is an exploded view of one of the readers, in the form of a optical imager.

With reference to FIG. 9, the first and second readers 86, 88 may take the form of optical imagers to capture optical images of the information bearing portions of the playing cards 41 which are exposed when the set of playing cards 40 is positioned in the receptacle 64. For example, the reader 86 can take the form of one-dimensional or two-dimensional arrays of charge coupled devices ("CCD") 89 and suitable optics 91, such as optical lenses for focusing an image on the CCD array 89. Such CCD arrays 89 can capture whole images at a time, or can be electronically caused to successively sample (e.g., pixel-by-pixel, row-by-row, or column-by-column) the exposed information bearing portions of the set of playing cards 40 (i.e., electronically scan). The readers 86, 88 may rely on ambient light, or may include one or more light sources such as light emitting diodes ("LEDs") or incandescent lights (not shown), which may or may not be controlled via the reader 86, 88.

Figure 10:
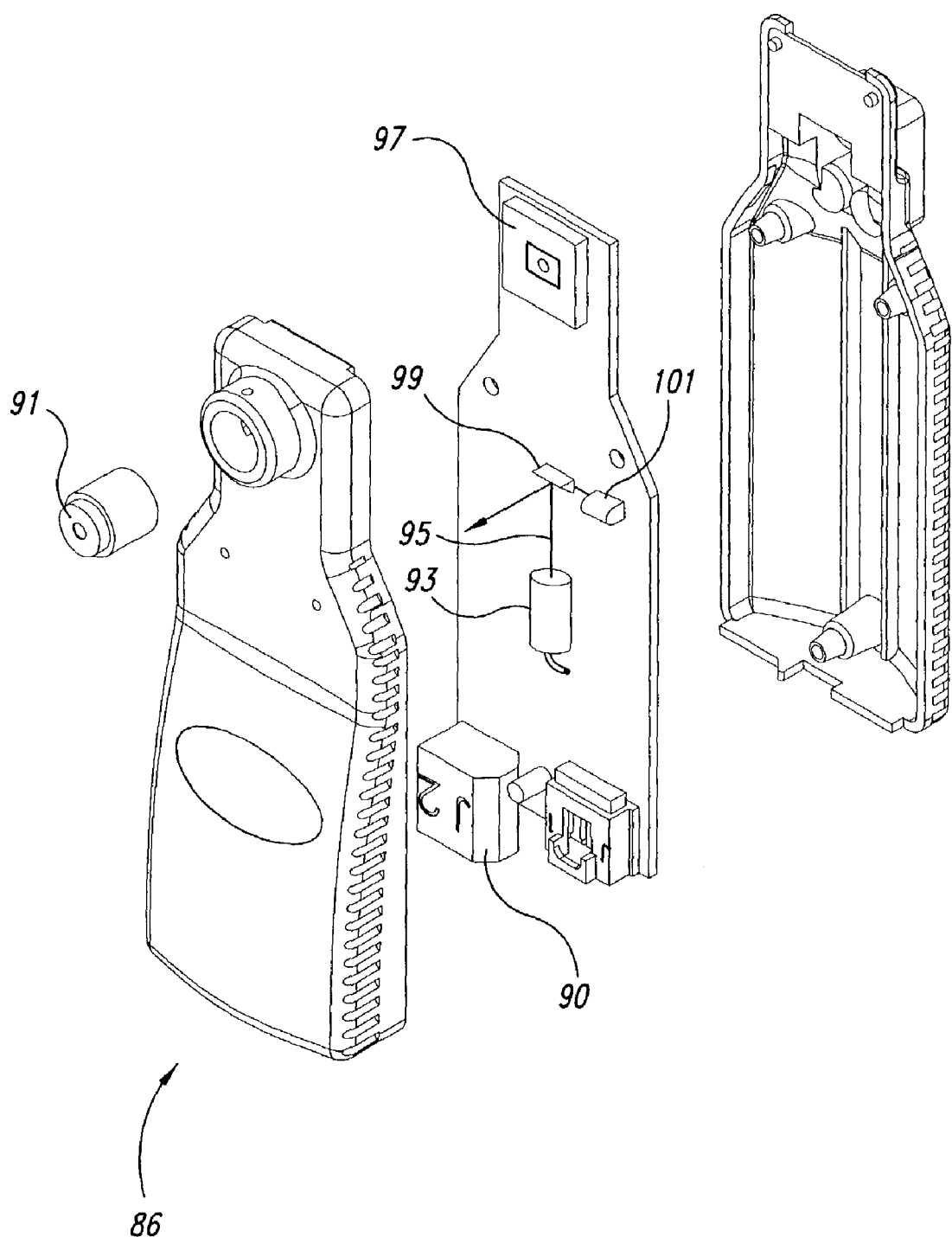
FIG. 10 is an exploded view of one of the readers, in the form of an optical scanner.

Alternatively, the readers 86, 88 may take the form of optical scanners to electronically capture the information bearing portions of the playing cards 41 which are exposed when the set of playing cards 40 is positioned in the receptacle 64. For example, the readers 86, 88 can take the form of one or more laser scanners and appropriate light detector(s) as shown in FIG. 10. The laser scanners can employ, for example, laser diodes 93 for producing a scanning beam 95 and one or more photodiode detectors 97 for detecting laser light reflected from the machine-readable indicia 46, 48 carried by the playing cards 40. The laser scanner can employ a movable light source and/or a movable reflector such as one or more dithering mirrors 99 coupled to a motor 101 to scan the light from the light source across the machine-readable indicia 46, 48. Additionally or alternatively, the laser scanner can employ a movable reflector (not shown) such as one or more dithering mirrors to scan the light reflected from the machine-readable indicia 46, 48 across the light detector 97.

Data ports 90 associated with each reader 86, 88 couple the imaging or scanning data from the reader 86, 88 to appropriate processing circuitry. As is typical in the ADC arts, processing may include amplifying the signal from the detector, analog-to-digital conversion or "wave-shaping" of the amplified signal, and decoding the converted signal into characters represented by the symbols forming the machine-readable indicia 46, 48. Thus, processing typically includes converting an analog signal representing variations in reflectance into digital data, and interpreting the digital data as meaningful information based on the underlying symbology (i.e., a mapping of machine-readable indicia, typically defined in terms of patterns of reflectance, to human-understandable characters).

With continuing reference to FIG. 3, suitable processing circuitry can take the form of a circuit board 92 including first and second connectors 94, 96 for coupling to the data ports 90 of the respective readers 86, 88. The circuit board 92 may also include buffers 98, 100 for temporarily buffering data received via the connectors 94, 96 from the readers 86, 88. The circuit board 92 may also include a processor 102 for processing data received from the readers 86, 88. The processor 102 can take a variety of forms, for example, one or more chip sets such as a general purpose central processing unit ("CPU"), application specific integrated circuit ("ASIC") and/or a digital signal processor ("DSP"). The circuit board 92 can also include one or more memories storing instructions and data for the processor 102, such as random access memory ("RAM") 104 and/or read-only memory ("ROM") 106. The processor 102 can execute instructions stored in an onboard memory (e.g., a register), RAM 104 or ROM 106 to cause the processor 102 to process the data received from readers 86, 88.

The circuit board 92 may be an integral component of the card reader 38, or may be a discrete component, for example a portion of a larger system associated with the gaming table 12 or with the gaming environment 10. The circuit board 92 may take the form of a discrete computing system, such as a personal computer ("PC"), with or without a digital signal processing board.

Figure 11:
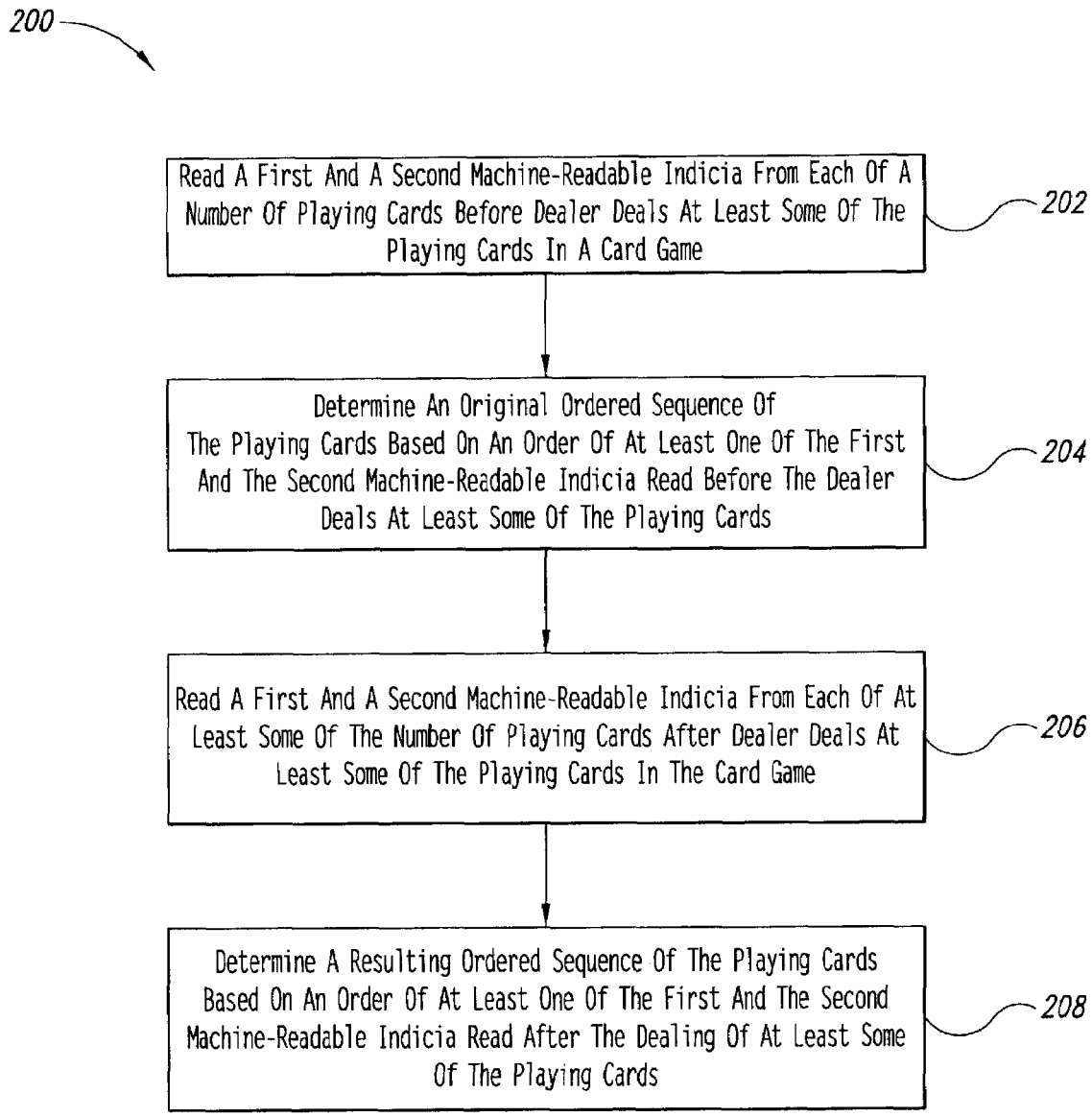
FIG. 11 is a flow chart of an exemplary method of employing the card reader in a card game.

FIG. 11 shows a method 200 of employing the card reader 38 in a card game. In step 202, the card reader 38 (FIG. 3) reads a first and a second machine-readable indicia 46, 48 (FIG. 2) from each of a number of playing cards 40 before the dealer 14 (FIG. 1) deals at least some of the playing cards 40 in a card game. The card reader 38 reads the first and second machine-readable indicia 46, 48 by either imaging and/or scanning. In step 204, the card reader 38 or an external processor 102 determines an original ordered sequence of the playing cards 40 based on an order of at least one of the first and the second machine-readable indicia 46, 48 read before the dealer 14 deals at least some of the playing cards. In step 206, the card reader 38 reads a first and a second machine-readable indicia 46, 48 from each of at least some of the number of playing cards 40 after the dealer 14 deals at least some of the playing cards 40 in the card game. In step 208, the card reader 38 or processor 102 determines a resulting ordered sequence of the playing cards 40 based on an order of at least one of the first and the second machine-readable indicia 46, 48 read after the dealing of at least some of the playing cards 40.

Figure 12:
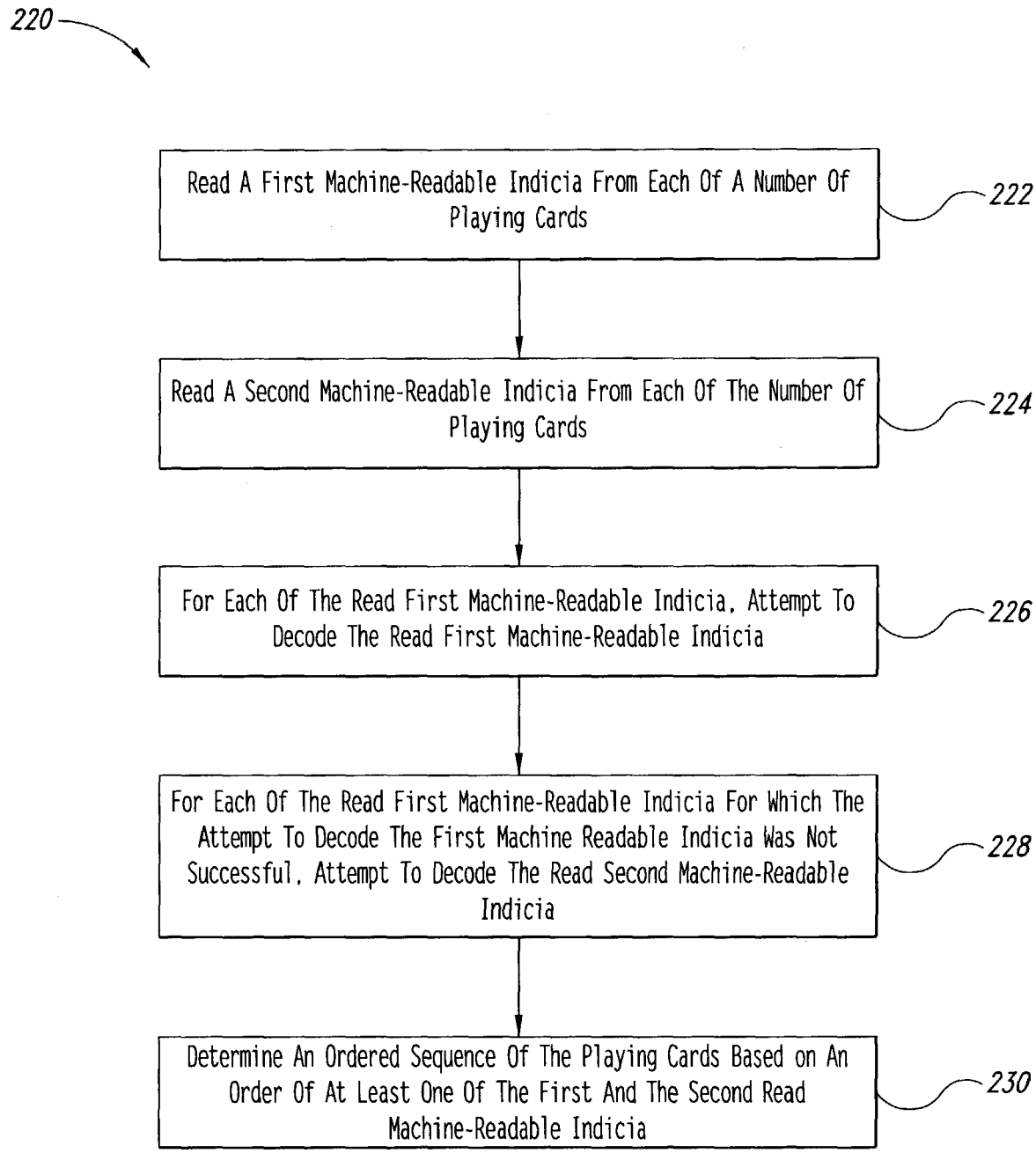
FIG. 12 is a flow chart of an exemplary method of reading machine-readable indicia from a number of playing cards and determining an ordered sequence from the read machine-readable indicia.

FIG. 12 shows a method 220 of determining an ordered sequence of playing cards 40. In step 222, the card reader 38 reads the first machine-readable indicia 46 from each of a number of playing cards 41 in the set of playing cards 40. In step 224, the card reader 38 reads a second machine-readable indicia 48 from each of a number of playing cards 41 in the set of playing cards 40. The card reader 38 reads the first and second machine-readable indicia 46, 48 by either imaging and/or scanning. In step 226, for each of the read first machine-readable indicia 46, the card reader 38 or processor 102 attempts to decode the read first machine-readable indicia 48. In step 228, for each of the read first machine-readable indicia 46 for which the attempt to decode was not successful, the card reader 38 or processor 102 attempts to decode the read second machine-readable indicia 48. In step 230, the card reader 38 or processor 102 determines an ordered sequence of playing cards 40 based on an order of at least one of the first and the second read machine-readable indicia 46, 48. Thus, the second machine-readable indicia 48 provides redundancy to the first machine-readable indicia 46, allowing the encoded information to be read even when the playing card has been damaged or a portion of the first machine-readable indicia 46 obscured.

Figure 13:
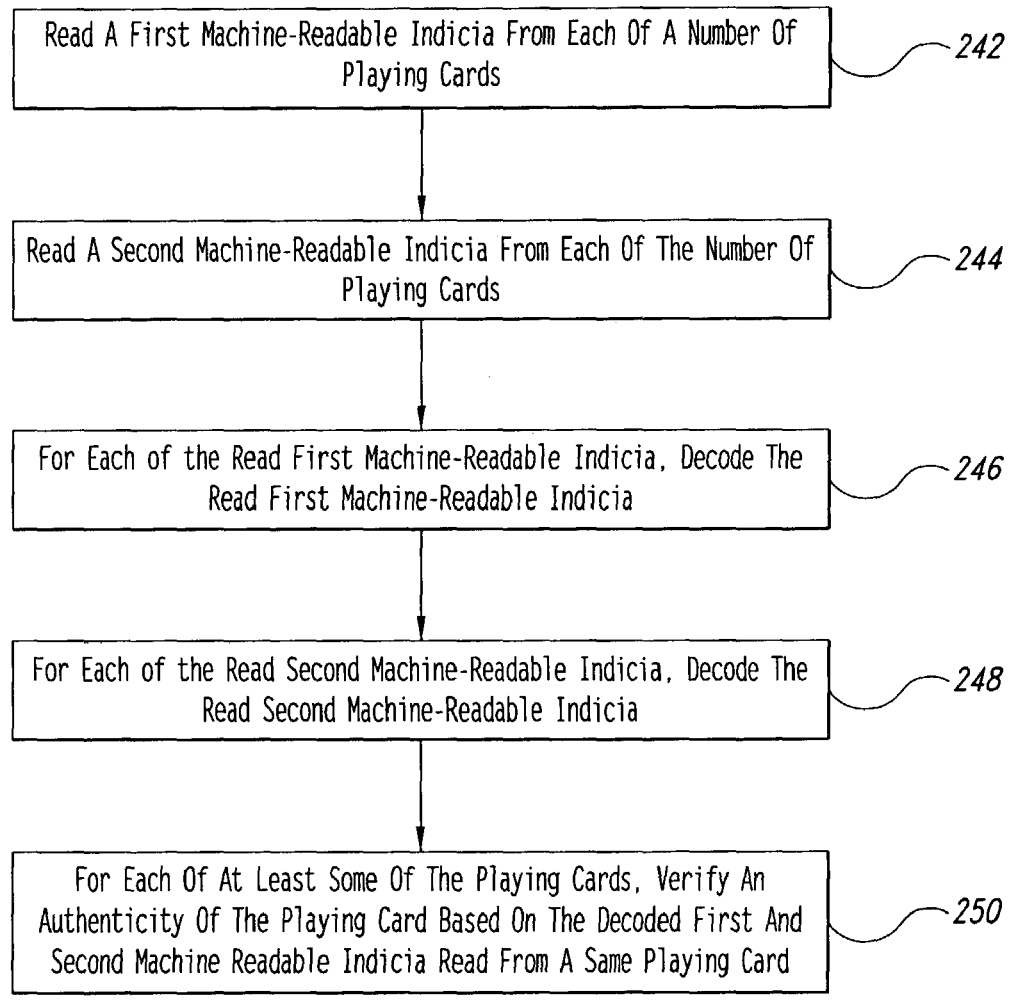
FIG. 13 is a flow chart of a method of reading machine-readable indicia from playing cards and verifying an authenticity of the playing cards based on the decoded machine-readable indicia.

FIG. 13 shows a method 240 of verifying the authenticity of playing cards. In step 242, the card reader 38 reads the first machine-readable indicia 46 from each of a number of playing cards 41 in the set of playing cards 40. In step 244, the card reader 38 reads a second machine-readable indicia 48 from each of a number of playing cards 41 in the set of playing cards 40. The card reader 38 reads the first and second machine-readable indicia 46, 48 by either imaging and/or scanning. In step 246 for each of the read first machine-readable indicia 46, the card reader 38 or processor 102 decodes the read first machine-readable indicia 46. In step 248, for each of the read second machine-readable indicia 48, the card reader 38 or processor 102 decodes the read second machine-readable indicia 48. In step 250, for each of at last some of the playing cards 41 in the set of playing cards 40, the card reader 38 or processor 102 verifies an authenticity of the playing card 41 based on the decoded first and second machine-readable indicia 46, 48 read from a same playing card 41.

In one embodiment, the card reader 38 or processor 102 verifies an authenticity of the playing card 41 by determining whether there is a match between the information encoded in the first machine-readable indicia 46 and the second machine-readable indicia 48. For example, the first and second machine-readable indicia may both encode a same unique identifier for the particular playing card 41, or set of playing cards 40. In another embodiment, the card reader 38 or processor 102 verifies an authenticity of the playing card 41 by determining whether there is a correspondence defined by an equation between the information encoded in the first machine-readable indicia 46 and the second machine-readable indicia 48. For example, the information encoded in the second machine-readable indicia 48 may be mathematically related, such as a value derived from an equation where the value encoded in the first machine-readable indicia 46 is supplied as a parameter. In yet another embodiment, the card reader 38 or processor 102 verifies an authenticity of the playing card 41 by determining whether there is the information encoded in the first machine-readable indicia 46 is associated or mapped to the information encoded in the second machine-readable indicia 48, for example via an associated defined in a lookup table or database. In a further embodiment the information encoded in the first machine-readable indicia 46 may be an encryption key required to decrypt the second machine-readable indicia 48, or information encoded in the second machine-readable indicia 48. Other forms of encryption are of course possible, including public/private key pair encryption techniques. In yet a further embodiment, the information encoded in the first and second machine-readable indicia 46, 48 may solve a defined algorithm, as discussed more fully below with reference to FIG. 14. The card reader 38 and/or processor 102 may employ combinations of the above embodiments.

Figure 14:
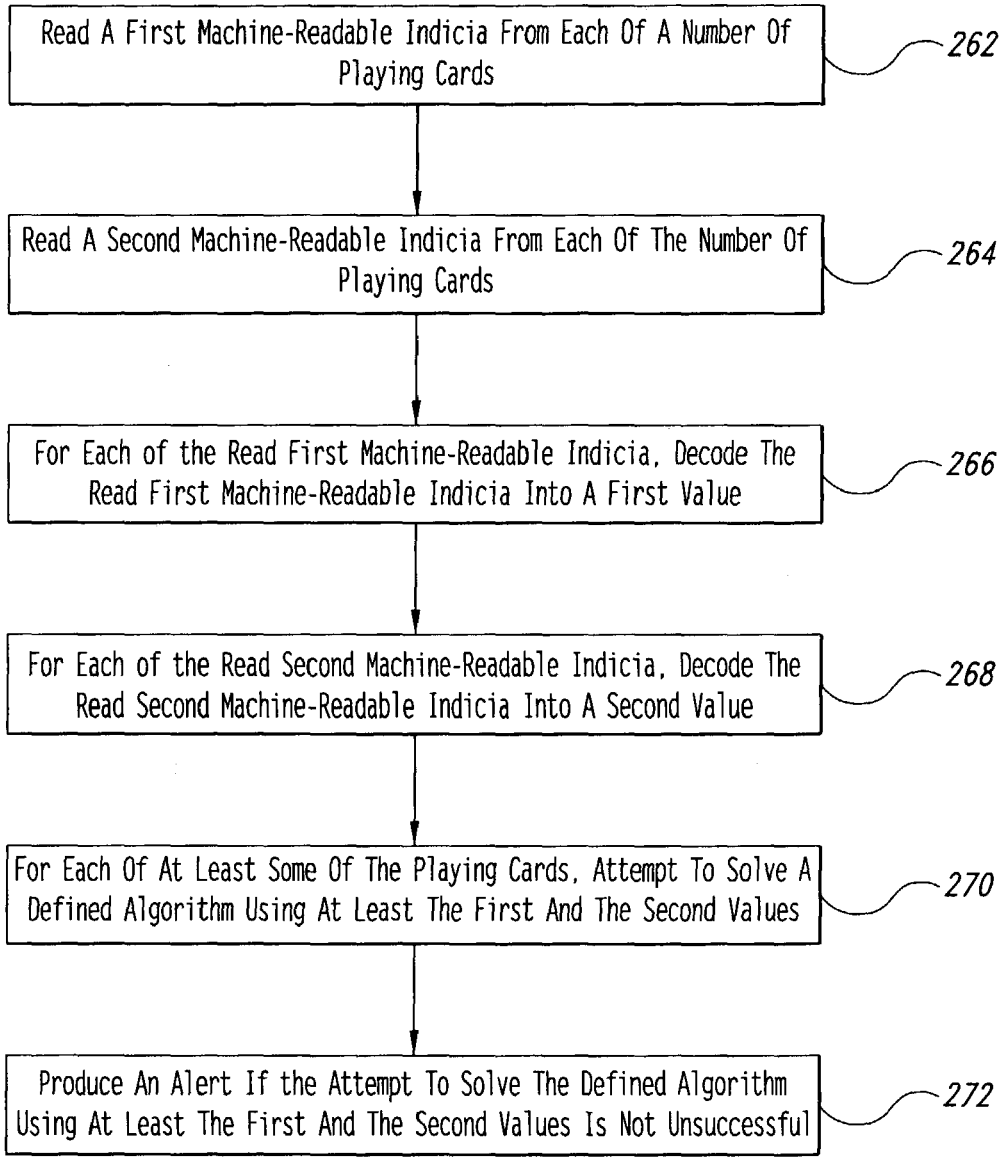
FIG. 14 is a flow chart showing a method of reading machine-readable indicia from the playing cards and attempting to solve an algorithm using values from the machine-readable indicia to verify the authenticity of the respective playing cards.

FIG. 14 shows a method 260 of verifying playing cards. In step 262, the card reader 38 reads the first machine-readable indicia 46 from each of a number of playing cards 41 in the set of playing cards 40. In step 264, the card reader 38 reads the second machine-readable indicia 48 from each of the number of playing cards 41 in the set of playing cards 40. In step 266, for each of the read first machine-readable indicia 46, the card reader 38 or processor 102 decodes the read first machine-readable indicia 46 into a first value. In step 268, for each of the read second machine-readable indicia 48, the card read 38 or processor 102 decodes the read second machine-readable indicia 48 into a second value. In step 270, for each of at least some of the playing cards 41 in the set of playing cards 40, the card reader 38 or processor 102 attempts to solve a defined algorithm using at least the first and the second values. In step 272, the card reader 38 and/or processor 102 produces an alert if the attempt to solve the defined algorithm using at least the first and second values is not successful.

Figure 15:
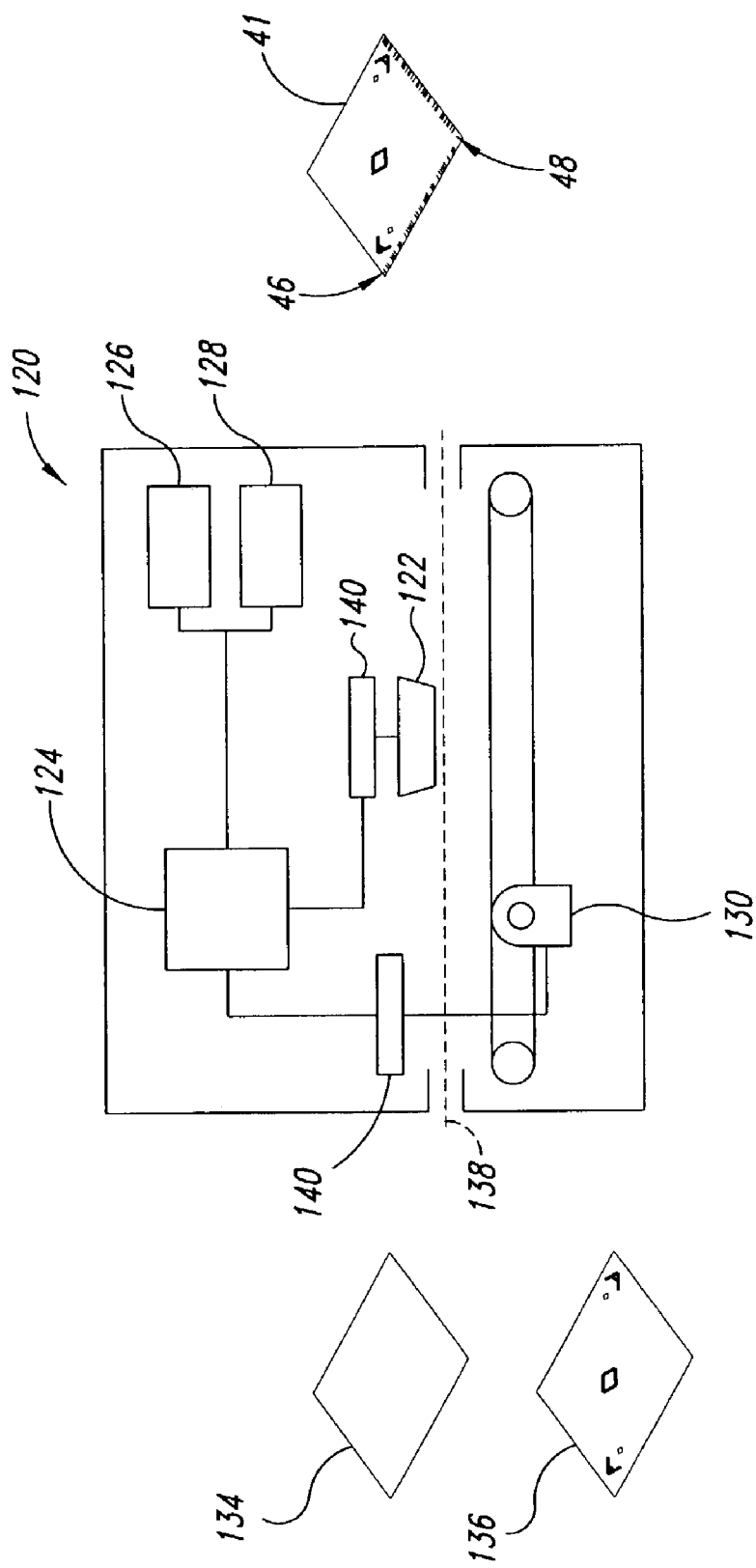
FIG. 15 is a schematic view of a device for producing playing cards carrying multiple related machine-readable indicia.

FIG. 15 shows a device 120 for producing the playing cards 41. The device 120 includes a printhead 122, processor 124, and memory such as RAM 126 and/or ROM 128 to store instructions and data for controlling the printhead 122 to produce the playing cards 40. The printhead 122 may take any of a variety of forms including but not limited to thermal, impact, inkjet, laser and/or xerographic printheads. The device 120 also includes a transport mechanism including a motor such as a stepper motor 130 and a conveyor 132 for transporting card blanks 134, 136 along a print path 138. The device 120 may employ a motor controller 140 to synchronize the operation of the printhead 122 with the position of the motor 130 and conveyor 132. The device 120 may also employ a print buffer 140 for temporarily holding print data for the printhead 122. The use of motor controllers 140 and print buffers 140 are generally known in the printing arts, thus will not be explained in further detail in the interest of brevity.

The device 120 can employ card blanks 134 without any markings, printing or other identifying information, the device providing all of the identifying indicia such as human-readable markings (e.g., rank and suit) and machine-readable indicia (e.g., barcode symbols) 46, 48 to the playing card blanks 134. This embodiment allows a high degree of control in playing card creation, allowing any particular playing card (i.e., suit and rank) to be produced at anytime with any desired association between the human-readable markings and machine-readable indicia 46, 48.

Alternatively, the device 120 can employ partially printed card blanks 136, which may be preprinted the human-readable markings and/or decorative designs such as the decorative designs commonly found on the backs of the playing cards 40. In such a case, the device 120 only needs to print the machine-readable indicia 46, 48 onto the playing card blanks 136. Limiting the amount of printing required to create the playing card 14 may increase the speed at which playing cards 41 can be created.

Figure 16:
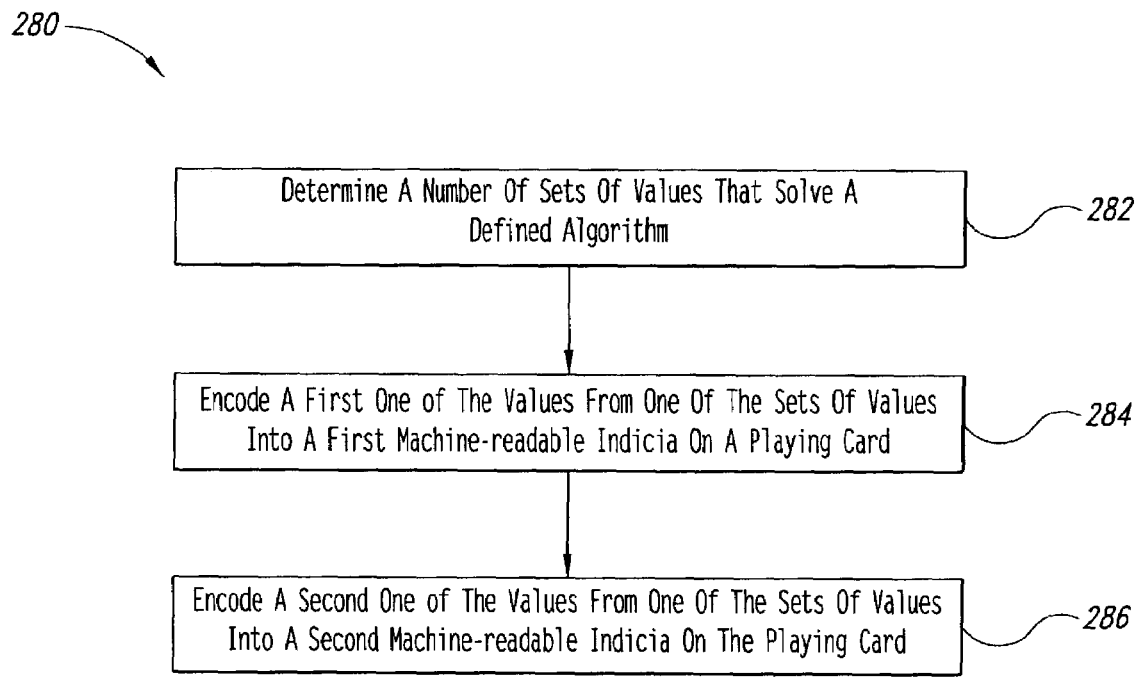
FIG. 16 is a flow chart of an exemplary method of producing a set of playing cards having machine-readable indicia related via an algorithm.

FIG. 16 shows a method 280 of creating a set of playing cards 40. In step 282, the processor 124 determines a number of sets of associated values, for example pairs of values that solve a defined algorithm. In step 284, a card creating device 120 encodes a first one of the values from one of the sets of values onto a playing card 41 as a first machine-readable indicia 46. In step 286, the card creating device 120 encodes a second one of the values from one of the sets of values onto the same playing card 41 as a second machine-readable indicia 48. The machine-readable indicia 46, 48 can be encoded on the playing card 41 by printing, or by other suitable means for physically associating the machine-readable indicia with playing cards 41. Thus, the playing card 41 includes related or associated first and second machine-readable indicia 46, 48 to allow verification, for example, by use of a defined algorithm, as discussed in reference to FIG. 14, above. Alternatively, the card creating device 120 may store the association between the sets of values in a memory, for example in a database or lookup table, for later use by the card reader 38 or controller 102 (FIG. 3) in verifying the authenticity of the playing card 41.

All of the above U.S. patents, U.S. patent application publications, U.S. patent applications, foreign patents, foreign patent applications and non-patent publications referred to in this specification and/or listed in the Application Data Sheet, including but not limited to U.S. patent application Ser. No. 09/474,858, filed Dec. 30, 1999, and entitled "METHOD AND APPARATUS FOR MONITORING CASINOS AND GAMING;" U.S. Provisional Patent Application No. 60/130,368, filed Apr. 21, 1999, and entitled "TRACKING SYSTEM FOR GAMES OF CHANCE;" and U.S. Provisional Patent Application No. 60/354,683, filed Feb. 6, 2002, and entitled "METHOD, APPARATUS AND ARTICLE EMPLOYING MULTIPLE MACHINE-READABLE INDICIA ON PLAYING CARDS," are incorporated herein by reference, in their entirety.

Although specific embodiments, and examples for, the invention are described herein for illustrative purposes, various equivalent modifications can be made without departing from the spirit and scope of the invention, as will be recognized by those skilled in the relevant art. The teachings provided herein of the invention can be applied to other systems for evaluating card games, not necessarily the blackjack card evaluation system 10 generally described above. For example, the teachings can employ networks, such as the Worldwide Web portion on the Internet, to interconnect the various described components. The various embodiments described above can be combined to provide further embodiments. For example, the illustrated methods can be combined, or performed successively. The illustrated methods can omit some acts, can add other acts, and can execute the acts in a different order than that illustrated to achieve the advantages of the invention.

These and other changes can be made to the invention in light of the above detailed description. In general, in the following claims, the terms used should not be construed to limit the invention to specific embodiments disclosed in the specification, but should be construed to include all computers, networks and card reading and evaluation systems that operate in accordance with the claims. Accordingly, the invention is not limited by the disclosure, but instead its scope is to be determined entirely by the following claims.

We claim:

1. A device for identifying playing cards in a stack of playing cards, the device comprising:
   a first card support surface to supportingly engage at least a portion of a long edge of each of a number of playing cards in the stack of playing cards, a second card support surface extending at an angle to the first card supporting surface to supportingly engage at least a portion of a short edge of each of the number of playing cards in the stack of playing cards, and a third card support surface for engagingly supporting a surface of an outermost one of the playing cards in the stack of playing cards, the third card support surface forming a first obtuse angle with the first card support surface and a second obtuse angle with respect to the second card support surface, the first, the second and the third card support surfaces forming a receptacle sized and dimensioned for receiving at least a portion of the stack of playing cards; and
   a reading mechanism positioned to read a first indicia extending along a long edge of the playing cards and a second indicia extending along a short edge of the playing cards.

2. The device of claim 1 wherein the device is carried by a gaming table having a horizontal table surface and the first, the second, and the third card support surfaces are each angled with respect to the horizontal table surface of a gaming table.

3. The device of claim 1 wherein the device is installed in a gaming table, below a horizontal table surface of the gaming table, and the first, the second, and the third card support surfaces are each angled with respect to the horizontal table surface of a gaming table.

4. The device of claim 1 wherein the angle between the first card support surface and the second card support surface is obtuse.

5. The device of claim 1 wherein the reading mechanism comprises:
   a first optical imager having a first field-of-view; and
   a second optical imager having a second field-of-view.

6. The device of claim 1 wherein the reading mechanism comprises:
   a first scanner having a first scan field-of-view; and
   a second scanner having a second scan field-of-view.

7. The device of claim 1 wherein the reading mechanism includes a single two-dimensional imager array, a first portion of the imager array having a first field-of-view and a second imager array having a second field-of-view.

8. The device of claim 1, further comprising:
   a processor coupled to the reading mechanism to receive data therefrom and configured to interpret the received data as an ordered sequence of playing cards.

9. The device of claim 1, further comprising:
   a processor coupled to the reading mechanism to receive data therefrom and configured to compare data the received data.

10. The device of claim 1, further comprising:
    a communications port coupled to the reading mechanism to couple data received from the reading mechanism externally from the device.

11. A gaming table for playing a card game, comprising:
    a playing surface;
    a receptacle mounted in the playing surface of the gaming table, the receptacle sized and dimensioned for receiving at least a portion of a set of playing cards, the receptacle having a first card support surface to supportingly engage at least a portion of a first edge of each of a number of playing cards in the set of playing cards, a second card support surface extending at an angle to the first card supporting surface to supportingly engage at least a portion of a second edge of each of the number of playing cards in the set of playing cards and a third playing card support surface to supportingly engage at least a portion of a surface of one of the playing cards when the set of playing cards are stacked in the receptacle, a first window formed in the first card support surface to expose at least a portion of the first edge of each of at least some of the number of playing cards and a second window formed in the second card support surface to expose at least a portion of the second edge of each of at least some of the number of playing cards; and
    at least a first reader having a first field-of-view, at least a portion of the first field-of-view aligned with at least the first window.

12. The gaming table of claim 11, further comprising:
    a second reader having a second field-of-view, at least a portion of the second field-of-view aligned with at least the second window.

13. The gaming table of claim 11, further comprising:
    a processor coupled to the first reader and configured to interpret data received from the first reader.

14. A method of reading information from playing cards, comprising:
    supportingly engaging a first edge of the set of playing cards at a first angle with respect to a horizontal table surface;
    supportingly engaging a second edge of the set of playing cards at a second angle with respect to the horizontal table surface;
    supportingly engaging a surface of an outermost one of the playing cards at a third angle with respect to the horizontal table surface to expose a first information carrying portion along the first edge of each of the playing cards and to expose a second information carrying potion along the second edge of each of the playing cards; and
    reading at least one of the first and the second information carrying potions of at least one of the playing cards.

15. The method of claim 14 wherein reading at least one of the first and the second information carrying potions of at least one of the number of playing cards includes concurrently reading the first and the second information carrying portions from one of the playing cards.

16. The method of claim 14 wherein reading at least one of the first and the second information carrying potions of at least one of the number of playing cards includes concurrently reading the first and the second information carrying portions from at least two of the playing cards.

17. The method of claim 14 wherein reading at least one of the first and the second information carrying potions of at least one of the number of playing cards includes concurrently imaging the first and the second information carrying portions from at least two of the playing cards.

18. A device for identifying playing cards, the device comprising:
   a receptacle sized and dimensioned for receiving at least a portion of a set of playing cards, the receptacle having a first card support surface to supportingly engage at least a portion of a first edge of each of a number of playing cards in the set of playing cards, a second card support surface extending at an angle to the first card supporting surface to supportingly engage at least a portion of a second edge of each of the number of playing cards in the set of playing cards and a third playing card support surface to supportingly engage at least a portion of a surface of one of the playing cards when the set of playing cards are stacked in the receptacle, a first window formed in the first card support surface to expose at least a portion of the first edge of each of at least some of the number of playing cards and a second window formed in the second card support surface to expose at least a portion of the second edge of each of at least some of the number of playing cards; and
   at least a first reader having a first field-of-view, at least a portion of the first field-of-view aligned with at least the first window.

19. The device of claim 18, further comprising:
   a second reader having a second field-of-view, at least a portion of the second field-of-view aligned with at the second window.

20. The device of claim 18, further comprising:
   a reflector positioned along an optical path between the second window and the first reader to align at least another portion of the first field-of-view with the second window.

21. The device of claim 18 wherein the first reader is one of an optical imager and an optical scanner.

22. The device of claim 18, further comprising:
   a processor coupled to the first reader and configured to interpret data received from the first reader.

23. The device of claim 18 wherein the receptacle is mounted for axial movement with respect to the first reader.

24. The device of claim 18, further comprising:
   a rail;
   at least one roller coupling the receptacle to the rail; and
   a spring biasing the receptacle toward a first position.

* * * * *

UNITED STATES PATENT AND TRADEMARK OFFICE
CERTIFICATE OF CORRECTION

PATENT NO.         : 7,222,852 B2
APPLICATION NO. : 10/360846
DATED              : May 29, 2007
INVENTOR(S)        : Richard Soltys et al.

Page 1 of 1

It is certified that error appears in the above-identified patent and that said Letters Patent is hereby corrected as shown below:

On the Title Page
Item (73) Assignee, "Ball Gaming International, Inc." should be -- Bally Gaming International, Inc. --

Signed and Sealed this

Twenty Second Day of April, 2008

JON W. DUDAS
*Director of the United States Patent and Trademark Office*